(12) United States Patent
Hermanson

(10) Patent No.: US 9,061,342 B2
(45) Date of Patent: Jun. 23, 2015

(54) STANDING SEAM CONNECTORS FOR DUCTING

(76) Inventor: Jeffrey Allen Hermanson, Sumner, WA (US)

( * ) Notice: Subject to any disclaimer, the term of this patent is extended or adjusted under 35 U.S.C. 154(b) by 477 days.

(21) Appl. No.: 12/953,050

(22) Filed: Nov. 23, 2010

(65) Prior Publication Data

US 2011/0121569 A1    May 26, 2011

Related U.S. Application Data

(60) Provisional application No. 61/264,201, filed on Nov. 24, 2009.

(51) Int. Cl.
| | |
|---|---|
| *B21D 39/20* | (2006.01) |
| *F16L 9/16* | (2006.01) |
| *F16L 23/12* | (2006.01) |
| *F24F 13/02* | (2006.01) |
| *B21D 39/02* | (2006.01) |
| *B21D 39/04* | (2006.01) |

(52) U.S. Cl.
CPC .............. *B21D 39/20* (2013.01); *B21D 39/02* (2013.01); *B21D 39/044* (2013.01); *F16L 9/165* (2013.01); *F16L 23/12* (2013.01); *F24F 13/0209* (2013.01); *F24F 13/0245* (2013.01)

(58) Field of Classification Search
USPC ........... 72/105, 106, 115, 117, 118, 120, 121, 72/125, 214, 220, 84
See application file for complete search history.

(56) References Cited

U.S. PATENT DOCUMENTS

| | | | |
|---|---|---|---|
| 233,145 | A | 10/1880 | Demarest |
| 565,499 | A | 8/1896 | Pattison |
| 704,936 | A | 7/1902 | Scherer |
| 872,442 | A | 12/1907 | Morris |
| 1,863,122 | A | 6/1932 | Matthews |
| 1,969,499 | A | 8/1934 | Bradshaw |
| 1,975,925 | A | 10/1934 | Compo |
| 2,123,410 | A | 7/1938 | Fawcett |
| 2,227,551 | A | 1/1941 | Morris |
| 2,245,037 | A | 6/1941 | Hersey, Jr. |
| 2,271,425 | A | 1/1942 | Harris |

(Continued)

FOREIGN PATENT DOCUMENTS

| | | |
|---|---|---|
| CA | 2117216 A1 | 9/1994 |
| DE | 29 16 801 A1 | 11/1980 |

(Continued)

OTHER PUBLICATIONS

Invitation to Pay Additional Fees and Partial International Search Report mailed Mar. 11, 2011. issued in corresponding International Application No. PCT/US2010/057830, filed Nov. 23, 2010, 4 pages.

(Continued)

*Primary Examiner* — Shelley Self
*Assistant Examiner* — Pradeep C Battula
(74) *Attorney, Agent, or Firm* — Christensen O'Connor Johnson Kindness PLLC

(57) ABSTRACT

Connectors for assembling HVAC ducting, and methods for forming the connectors are provided. The connectors include standing-seam connectors and flanged connectors. The flanged connectors can be formed directly on ducting (e.g., spiral ducting). The methods enable the fabrication of the connectors, with exemplary fabrication methods including spin forming and radial expansion.

5 Claims, 20 Drawing Sheets

(56) References Cited

U.S. PATENT DOCUMENTS

| | | | |
|---|---|---|---|
| 2,338,191 | A | 1/1944 | Lumm |
| 2,473,102 | A | 6/1949 | Krooss |
| 2,474,887 | A | 7/1949 | Carswell |
| 2,489,587 | A | 11/1949 | Rice |
| 2,519,847 | A | 8/1950 | Neely |
| 2,541,205 | A | 2/1951 | Christophersen |
| 2,548,249 | A | 4/1951 | Woolsey |
| 2,599,882 | A | 6/1952 | Adams |
| 2,674,471 | A | 4/1954 | Hawkins |
| 2,826,804 | A | 3/1958 | Wickwire |
| 2,883,211 | A | 4/1959 | Grass |
| 2,916,076 | A | 12/1959 | Young |
| 3,001,805 | A | 9/1961 | Jones |
| 3,266,285 | A | 8/1966 | Jensen |
| 3,329,446 | A | 7/1967 | Katis |
| 3,347,569 | A | 10/1967 | Lindgren |
| 3,710,609 | A | 1/1973 | Jones |
| 3,712,649 | A | 1/1973 | Martin |
| 3,749,425 | A | 7/1973 | Howland |
| 3,815,638 | A | 6/1974 | Martin |
| 3,871,688 | A | 3/1975 | Molino |
| 3,996,783 | A | 12/1976 | Meserole |
| 4,023,250 | A | 5/1977 | Sproul |
| 4,041,746 | A | 8/1977 | Kraft |
| 4,046,409 | A | 9/1977 | Virgin |
| 4,117,704 | A | 10/1978 | Nakache |
| 4,144,732 | A | 3/1979 | Franks |
| 4,170,888 | A | 10/1979 | Golata |
| 4,215,518 | A | 8/1980 | Blair |
| 4,304,423 | A | 12/1981 | Mez |
| 4,361,021 | A | 11/1982 | McVay |
| 4,418,948 | A | 12/1983 | Lew |
| 4,516,797 | A | 5/1985 | Meinig |
| 4,524,595 | A | 6/1985 | Oda |
| 4,571,980 | A | 2/1986 | Goodwin |
| 4,653,725 | A | 3/1987 | Nanz |
| 4,765,167 | A | 8/1988 | Sampson |
| 4,803,881 | A | 2/1989 | Dudley |
| 4,862,724 | A | 9/1989 | Haws |
| 4,914,939 | A | 4/1990 | Brinegar |
| 4,940,264 | A | 7/1990 | Mez |
| 4,974,440 | A | 12/1990 | Brinegar |
| 5,022,668 | A | 6/1991 | Kenny |
| 5,022,688 | A | 6/1991 | Arnoldt |
| 5,129,690 | A | 7/1992 | Meinig |
| 5,133,580 | A | 7/1992 | Meinig |
| 5,195,789 | A | 3/1993 | Walsh |
| 5,352,000 | A | 10/1994 | Issagholian-Havai |
| 5,393,106 | A | 2/1995 | Schroeder |
| 5,456,099 | A | 10/1995 | Lipari |
| 5,762,109 | A | 6/1998 | Matthews | |
| 5,809,649 | A | 9/1998 | Kostermeier | |
| 5,983,496 | A | 11/1999 | Hermanson | |
| 6,000,260 | A | 12/1999 | Price | |
| 6,260,403 | B1 | 7/2001 | Johnston | |
| 6,289,706 | B1 | 9/2001 | Hermanson | |
| 6,301,781 | B1 | 10/2001 | Hermanson | |
| 6,540,266 | B2 | 4/2003 | Pakker | |
| 6,644,083 | B2 | 11/2003 | Pakker | |
| 6,935,152 | B2 * | 8/2005 | Dole et al. | 72/105 |
| 2001/0054822 | A1 | 12/2001 | Pakker | |
| 2002/0094233 | A1 | 7/2002 | Price | |
| 2005/0116470 | A1 | 6/2005 | Duffy | |
| 2008/0134745 | A1 * | 6/2008 | Hermanson | 72/379.2 |

FOREIGN PATENT DOCUMENTS

| | | | |
|---|---|---|---|
| DE | 43 08 013 A1 | | 9/1994 |
| EP | 0 443 193 A2 | | 8/1991 |
| EP | 0 458 062 A2 | | 11/1991 |
| EP | 0 537 594 A2 | | 4/1993 |
| EP | 0 687 845 A1 | | 12/1995 |
| GB | 871 733 A | | 6/1961 |
| GB | 1 242 990 A | | 8/1971 |
| GB | 1 425 778 A | | 2/1976 |
| GB | 1 581 386 A | | 12/1980 |
| JP | 60238528 A | * | 11/1985 |
| JP | 61007028 A | * | 1/1986 |

OTHER PUBLICATIONS

International Search Report and Written Opinion mailed May 9, 2011, issued in corresponding International Application No. PCT/US2010/057830, filed Nov. 23, 2010, 13 pages.

"HVAC Duct Construction Standards: Metal and Flexible," 2d ed., Sheet Metal and Air Conditioning Contractors' National Association, Inc. [SMACNA], Chantilly, Va., 1995, "Table 1-12 Transverse Joint Reinforcement," p. 1.36.

Johnson, H.V., "Metal Spinning Designs," Bruce Publishing, Milwaukee, Wisc., 1941, Chap. II, "Tools and Materials," pp. 12-13, 15-16; Chap. III, "Fundamentals of Metal Spinning," pp. 21-27.

Reagan, J.E., and E.E. Smith, "Metal Spinning for Craftsmen, Instructors, and Students," Bruce Publishing, Milwaukee, Wisc., 1936, Chap. IV, "Spinning Tools," pp. 23-28; Chap. V, "Chucks for Metal Spinning," pp. 29-32,34-36.

Stieri, E., "Sheet Metal Principles and Procedures," Prentice-Hall, New York, 1953, Chap. 9, "Metal Spinning," pp. 176-185.

Walker, J.R., "Modern Metalworking," Goodheart-Willcox, South Holland, Ill., 1985, Unit 11, "Sheet Metal," pp. 141-158; Unit 27, "Metal Spinning," pp. 425-436.

* cited by examiner

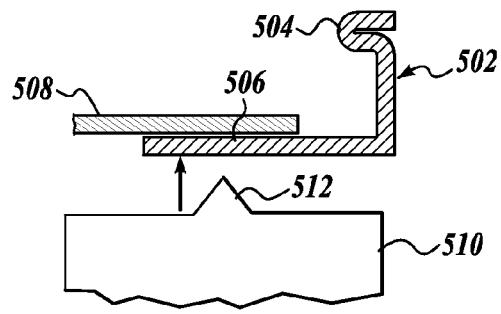
*Fig.15A.*
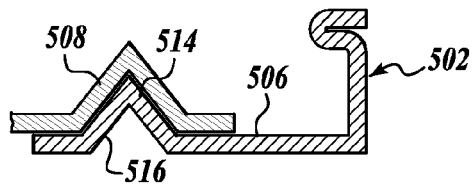
*Fig.15B.*
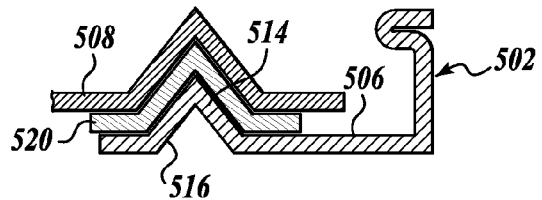
*Fig.15C.*
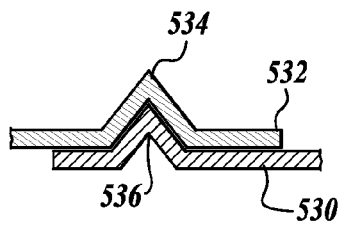
*Fig.15D.*
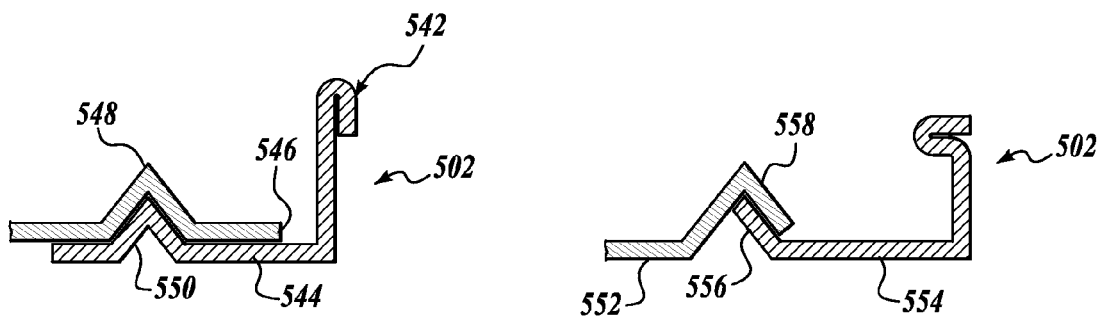
*Fig.15E.*          *Fig.15F.*

STANDING SEAM CONNECTORS FOR DUCTING

CROSS-REFERENCE TO RELATED APPLICATION

This application claims the benefit of U.S. Provisional Application No. 61/264,201, filed Nov. 24, 2009, the disclosure of which is incorporated herein by reference in its entirety.

FIELD OF THE INVENTION

The present invention relates to connectors for circular and oval heating, ventilation, and air conditioning (HVAC) ducting, and methods for forming the connectors.

BACKGROUND

While the field of HVAC ducting is relatively mature, cost pressure drives a constant need to develop new and improved ducting, parts, manufacturing methods, and techniques for assembling ducting. Due to the high cost of labor, improved ducting that can be more efficiently assembled, for example, by reducing the number of laborers required to piece together an assembly, provides a significant cost advantage. Relatedly, new designs for ducting and/or parts can aid in improved assembly efficiency. Additionally, manufacturing techniques for ducting and/or parts can be improved to produce finished products as inexpensively as possible.

With regard to inefficiencies in assembling ducting, a typical process for assembling two lengths of HVAC ducting requires two laborers: one to push on the end of one of the two duct sections to engage the two sections together, and a second to secure the connection between the two sections, such as by screws, connection bands, or rivets. Ducting parts that improve the assembly process efficiency, for example, by allowing assembly to be accomplished by a single laborer, would provide a cost-saving benefit.

With regard to manufacture of ducting and connectors, spin-forming, roll-forming, stamping, and bending metal strips into a finished product are known to those of skill in the art. However, despite the maturity of HVAC manufacturing processes, new techniques, and new ways to apply known techniques, can improve manufacturing efficiency and can also enable the formation of new connector shapes previously not possible.

One area of difficulty in manufacturing HVAC ducting and connectors is the limitation created by roll forming, one of the most popular manufacturing techniques. Specifically, roll forming is limited generally to sheet-metal thinner than 10 gauge because roll forming causes tearing or breaking of sheet metal in the production of connectors (e.g., flanged rings) from thinner sheet metal.

The predominate means of manufacturing HVAC ducting is in the form of spiral seam tubes made up of helical wound sheet-metal strips with the strips interconnected by means of lock seams. The lock seams stand out from the outer duct surface. Because the lock seams create a structurally weak point in the duct, spiral ducting is difficult to further shape, using a technique such a spin forming. However, techniques that would allow for further shaping spiral ducting would be desirable to provide a new means for improving manufacturing efficiency of ducting and connectors for HVAC systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method is provided for forming a standing seam connector from a cylindrical metal band having a radially outward surface and a radially inward surface, the method comprising:

deforming the cylindrical metal band using pressure applied from a tool pressing against the interior surface of the band at a location intermediate a first longitudinal portion and a second longitudinal portion of the band, to provide a deformed section of the band extending radially outwardly from the outer surface of the band; and compressing the radially outwardly deformed section in the longitudinal direction to form a transverse annular standing seam intermediate the first and second longitudinal portions and extending radially outward of the outward surface of the band.

In another aspect, a method is provided for forming a flanged ring connector from a cylindrical metal band having a radially outward surface and a radially inward surface, the method comprising:

deforming the cylindrical metal band by using a tool to apply pressure to the interior surface of the band at a location adjacent a first end of the band, to form a radially outward flange portion at the end of a cylindrical longitudinal portion; and compressing the radially outward flange portion over on itself to form a flange face and a return section that partially overlaps the flange face.

In another aspect, a standing seam connector for joining two lengths of ducting in an HVAC system and formed from a piece of metal band stock is provided, the connector comprising a sleeve defining a first longitudinal section and a second longitudinal section, and an annular standing seam extending transversely outward between 0.75 inches and 1.5 inches from the sleeve intermediate the first and second longitudinal sections.

In another aspect, a flanged connector is provided comprising a cylindrical longitudinal portion and a flange portion extending transversely from a first end of cylindrical the longitudinal portion, wherein the flange portion comprises a flange face and a return folded to at least partially overlap the flange face.

DESCRIPTION OF THE DRAWINGS

The foregoing aspects and many of the attendant advantages of the disclosed embodiment will become more readily appreciated as the same become better understood by reference to the following detailed description, when taken in conjunction with the accompanying drawings, wherein:

FIGS. 15A-15C illustrate a representative method for using an expander to form a V-lock between a length of ducting and a flanged connector;

FIGS. 15D-15F illustrate alternative embodiments of the method for using an expander, as illustrated in FIGS. 15A-15C, to lock lengths of ducting (FIG. 15D) and a length of ducting to a flanged connector (FIG. 15E);

DETAILED DESCRIPTION

Connectors for assembling metal ducting and methods for forming the connectors are provided herein. The connectors are particularly useful for circular, oval, and other shaped heating, ventilation, and air conditioning (HVAC) ducting. The provided connectors include standing-seam connectors, flanged connectors, and ducting having a flanged end directly formed on the ducting (e.g., spiral ducting having a flanged end or ends).

Figure 1:
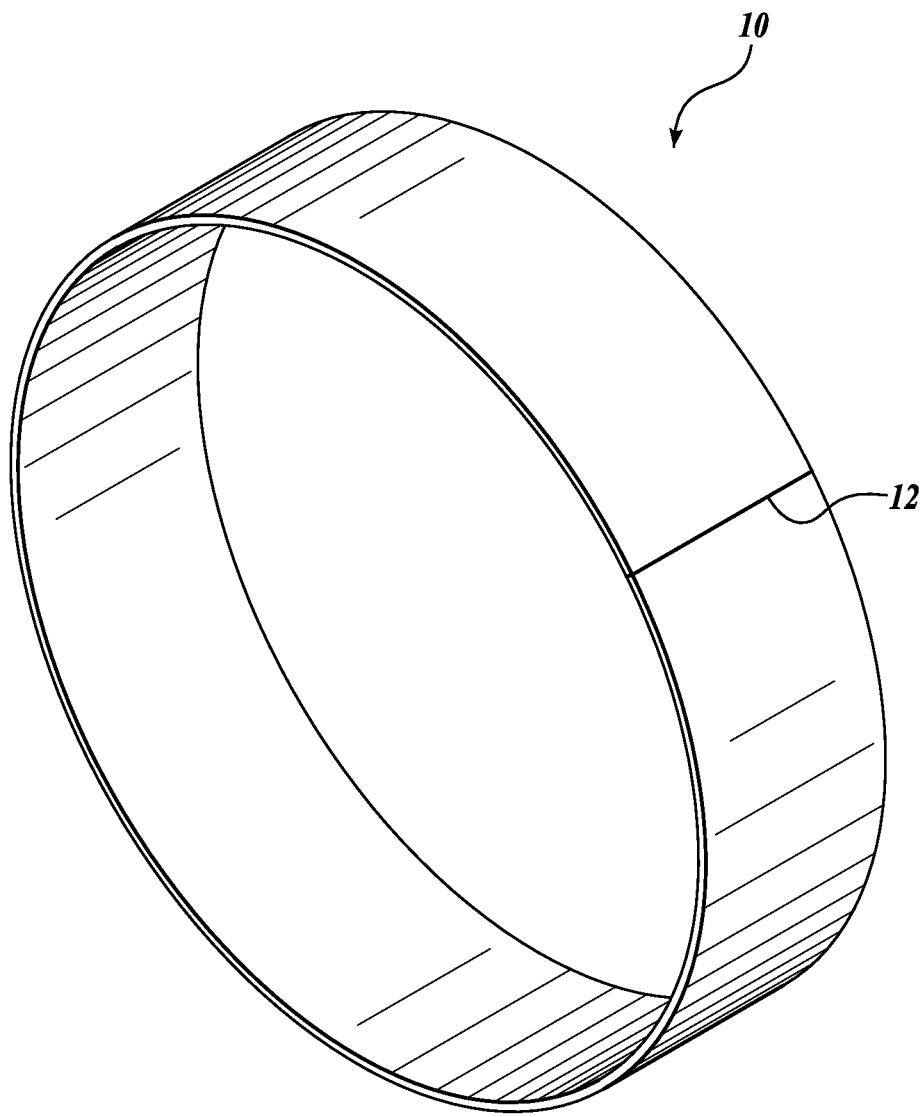
FIG. 1 illustrates a circular band useful in forming the connectors (e.g., standing-seam connectors and flanged connectors) in accordance with the embodiments provided herein.

The raw materials used to form the connectors in accordance with the embodiments provided herein can be any pipe or ducting known to those of skill in the art. In representative embodiments, the material is a longitudinal-seam band, as illustrated in FIG. 1. Referring to FIG. 1, the portion of band 10 includes a longitudinal seam 12 joining two ends of a strip to form a circular band. The circular band 10 can then be used with the embodiments provided herein to form the connectors and/or flanged connectors.

Lock Form Quality steel of gauge 10 to 20 is an exemplary starting material for forming the connectors. However, one benefit of the methods provided herein is that up to 6 gauge, or thicker, metal can be used to form the connectors. Therefore, in certain embodiments, the connectors are formed from 6 gauge or thicker metal. In certain embodiments, up to 0.25 inch steel can be used to form the connectors.

Another preferred starting material for the embodiments provided herein is metal spiral ducting, as is known to those of skill in the art. Several embodiments provided herein are specifically directed to the formation of connectors for spiral ducting, as will be described in more detail below. The spiral ducting can be cut into short lengths to form bands, such as in band 10 above.

In certain embodiments, the connectors are formed using spin-forming. Spin-forming is a technique known to those of skill in the art and involves affixing a metal cylinder, for example the band 10 illustrated in FIG. 1, to an apparatus that spins the ban rapidly. Forming tools, such as those illustrated in FIGS. 2A-2D are then used to mold and form shapes in the band using pressure applied from the interior and/or exterior of the spinning band.

Figure 2A:
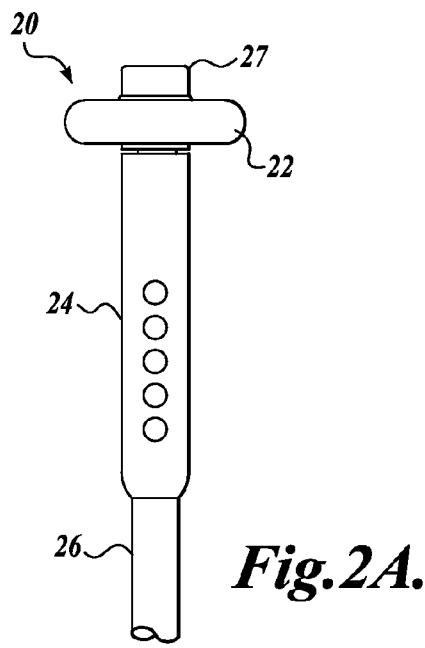
FIG. 2A-2D illustrate various representative spin-forming tools useful in forming the connectors from a band in accordance with the embodiments provided herein.
Figure 2B:
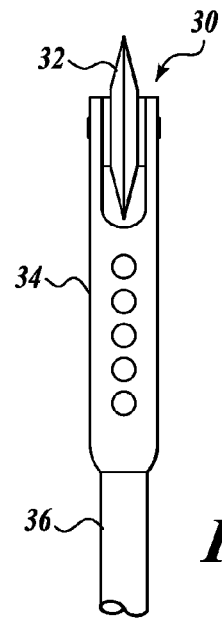
Figure 2C:
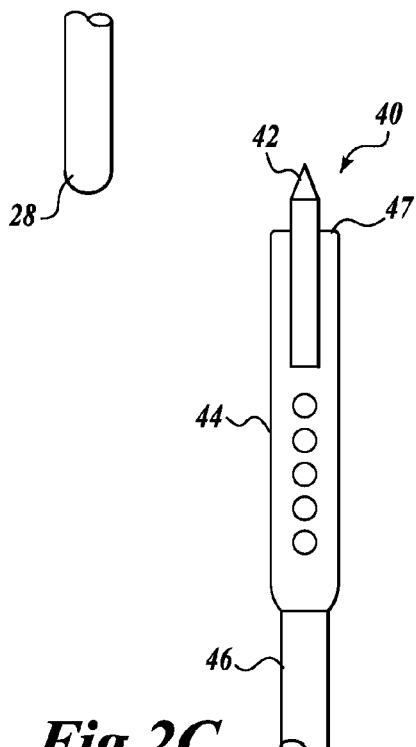
Figure 2D:
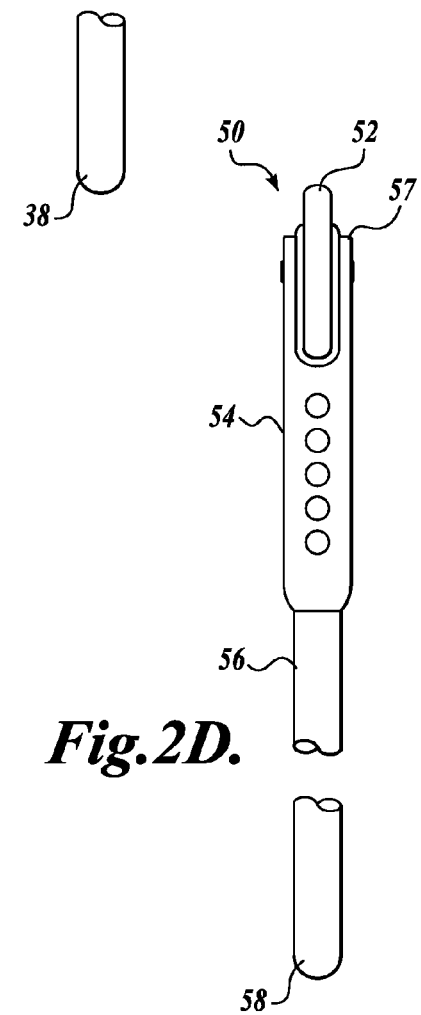

The forming and trimming of the spinning band during spin forming can be accomplished using standard machine tools including:

1) an Internal Roller 20, as shown in FIG. 2A, having an Internal Roller Wheel 22 comprising a wheel having a perimeter consisting of a convex wheel working surface and pivot means attached by means to a Internal Roller Tool Fixture 24 provided, for example, by an Internal Roller Handle 26 permitting the wheel to rotate in a plane 90 degrees to a longitudinal axis from an Internal Roller Handle First and Second Ends 27, 28 when the wheel working surface is in contact with the spinning band;

2) a Radius Roller 30, as shown in FIG. 2B, having a Radius Roller Wheel 32 comprising a wheel having a perimeter consisting of a convex wheel working surface and pivot means attached by means to a Radius Roller Tool Fixture 34 provided, for example, by a Radius Roller Handle 36 permitting the wheel to rotate in a plane parallel to a longitudinal axis from a Radius Roller Handle First and Second Ends 37, 38 when the wheel working surface is in contact with the spinning band;

3) a Trim Lever 40, as shown in FIG. 2C, comprising a Cutting Tip 42 affixed to a Trim Lever Tool Fixture 44 provided, for example, by a Trim Lever Handle 46 permitting the Cutting Tip 42 to extend parallel with a longitudinal axis from the Trim Lever Handle First to Second Ends 47, 48 with the Cutting Tip 42 for cutting or trimming the metal of the spinning band (e.g., to trim a portion of metal from the band end); and 4) a Finishing Roller 50, as shown in FIG. 2D, having a Finishing Roller Wheel 52 having a perimeter consisting of a convex wheel working surface and pivot means attached to a Finishing Roller Tool Fixture 54 provided, for example, by a Finishing Roller Handle 56 permitting the Finishing Roller Wheel 52 to rotate in a plane parallel to a longitudinal axis from a Finishing Roller Handle First and Second Ends 57, 58 when the wheel working surface is in contact with the spinning band.

The Internal Roller 20, Radius Roller 30, Trim Lever 40 and Finishing Roller 50 are urged against the appropriate portions of the spinning band by machining process means, including by manual/hand manipulated means, automated machine tool means operated and controlled by computers and computer programs and other process control systems and other machine tool processes. It is to be understood that tools used with automated machines, would not have handles, such has handles 26, 36, 46, or 56, but would be of configurations compatible with the construction and operation of the automated machines.

The use of spin-forming methods and apparatus are described more completely in U.S. Pat. Nos. 7,082,796 and 7,216,898, both of which are incorporated herein by reference in their entirety.

Roll forming is also useful in certain embodiments provided herein. Roll forming is well known to those of skill in the art. Roll forming typically is not used on banded metal directly, and rather the technique is limited to forming a profile in a linear sheet or band of metal and then manipulating the sheet or band to form a ring connector, etc.

Additionally useful in certain embodiments provided herein is a technique referred to herein as "expanding," which uses an expander machine configured to provide even radial pressure from the interior of a band. The use of an expander in certain embodiments provided herein is described in more detail below with regard to FIGS. 22A and 22B.

Figure 3:
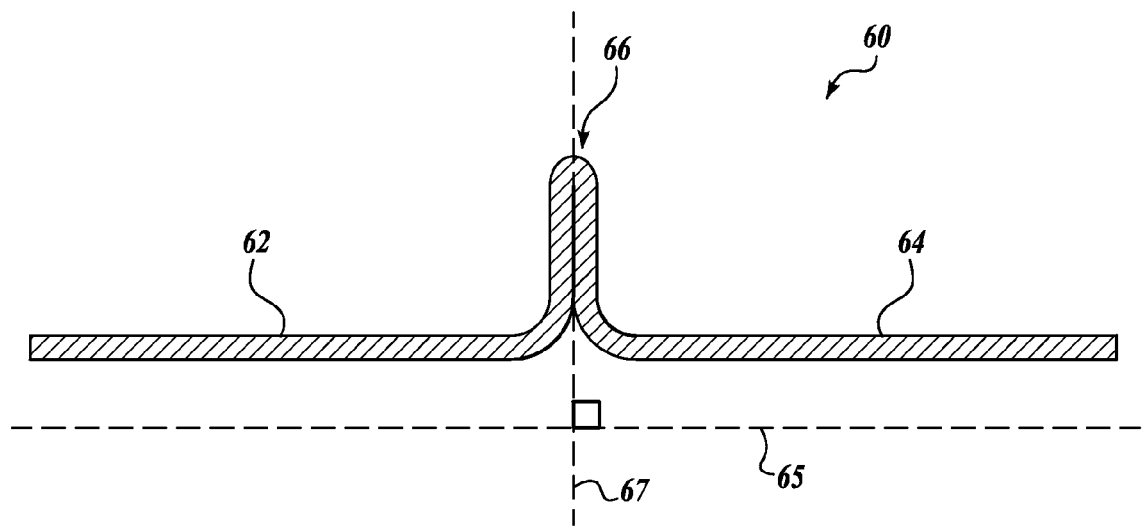
FIG. 3 is a cross sectional view of a standing-seam connector in accordance with the embodiments provided herein.

In one aspect of the invention, a standing-seam connector is provided for connecting two lengths of ducting. As illustrated in FIG. 3, the standing-seam connector 60 includes a sleeve portion defining a first longitudinal portion 62 and a second longitudinal portion 64, and a standing seam 66 extending transversely from an outer surface of the sleeve portions. The standing seam 66 is on a radial plane 67 generally lateral to a longitudinal axis 65 of the standing-seam connector 60. The plane 67 can be transverse or even perpendicular to the longitudinal axis, but does not have to be exactly so.

The standing seam 66 is a continuous seam (i.e., not welded) that is folded. The standing seam 66 typically extends from about 0.75 to 2.5 inches above the radially outward surface of the band. One advantage of a standing seam of this height is that the seam serves as an abutment or gripping locating for a vice-grip or other tool when engaging the sleeve portion of the connector into the adjacent length of ducting. Also, the seam can be grasped directly by a workman when engaging the sleeve portion of the connector into the end of an adjacent duct.

Figure 6A:
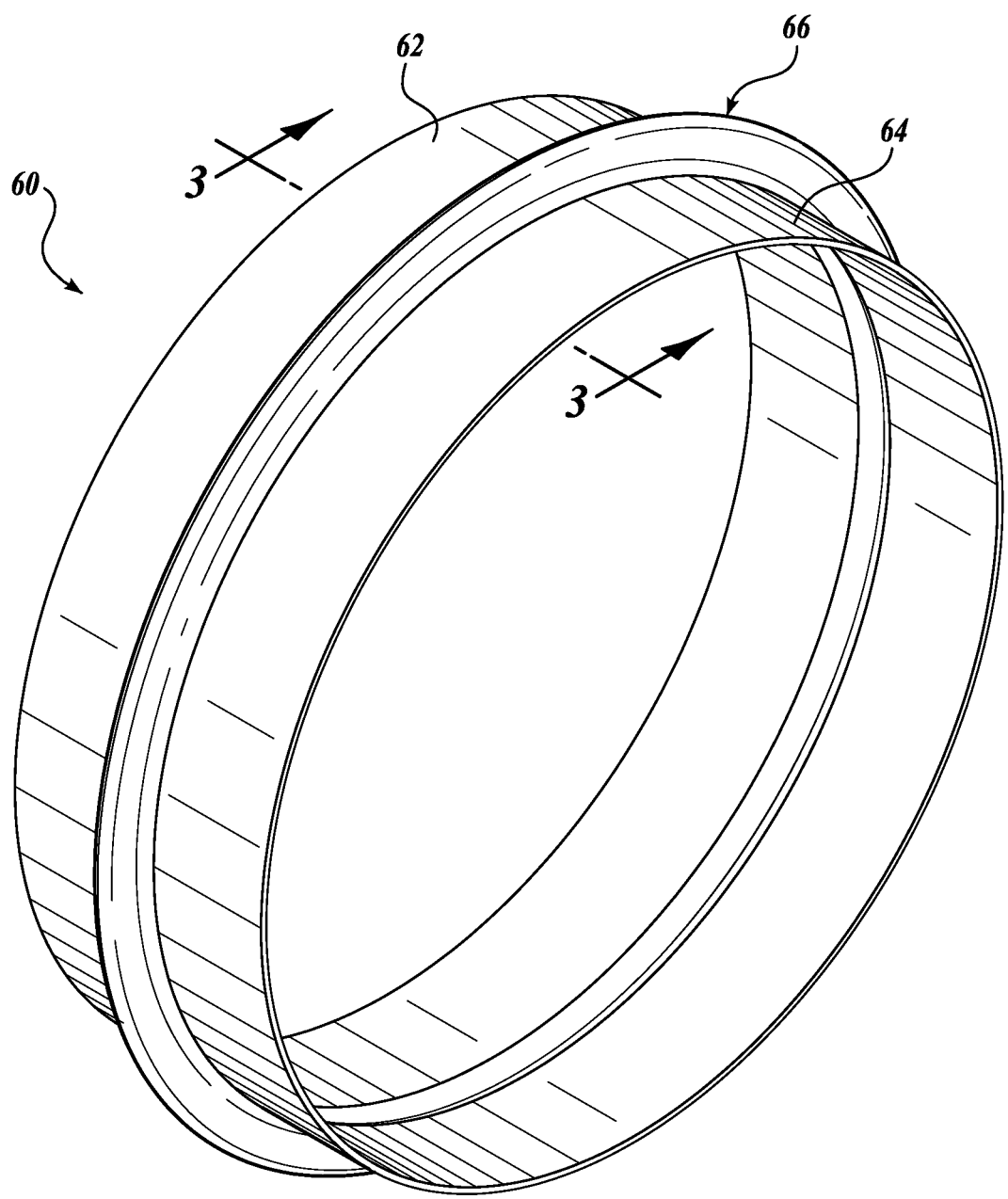
FIG. 6A illustrates a representative standing-seam connector in accordance with the embodiments provided herein.
Figure 6B:
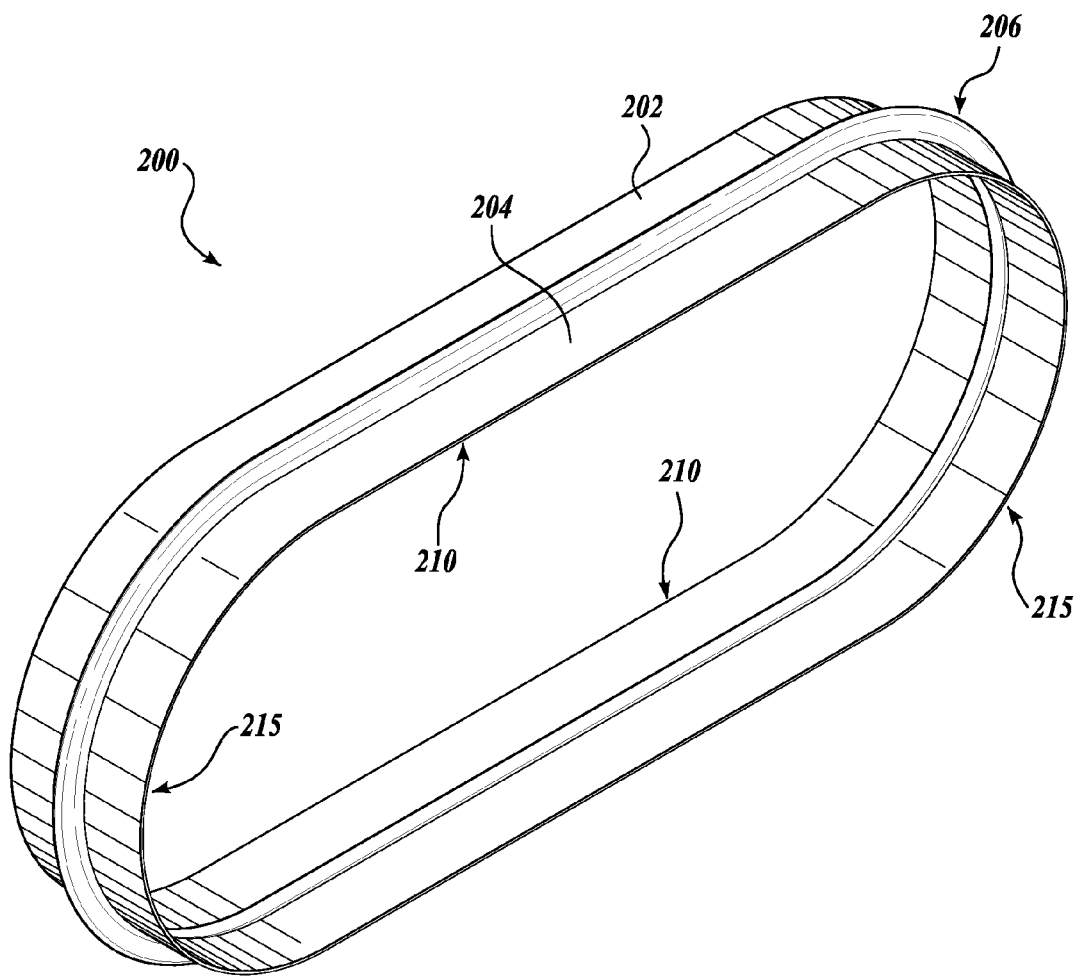
FIG. 6B illustrates an oval standing-seam connector in accordance with the embodiments provided herein.

FIG. 6A is an isometric view of a circular standing-seam connector having the cross sectional profile illustrated in FIG. 3. Additionally, FIG. 6B illustrates an oval standing-seam connector in accordance with the embodiments provided herein, having a similar cross section as illustrated in FIG. 3. Referring to FIG. 6B, the oval standing-seam connector 200 includes first longitudinal portion 202, second longitudinal portion 204, and a standing seam 206. In the embodiment illustrated in FIG. 6B, the oval form of the standing-seam connector has two semicircular portions 215 and two linear portions 210 having the cross section as illustrated in FIG. 3

(e.g., by deforming/elongating a circular standing-seam connector 60, or other techniques known to those of skill in the art). It is to be understood that standing-seam connectors of other shapes, such as square or rectangular can also be produced, for example be beginning with a circular shaped connector and then forming the connector into a different shape using expansion/forming dies or other tools.

Figure 4A:
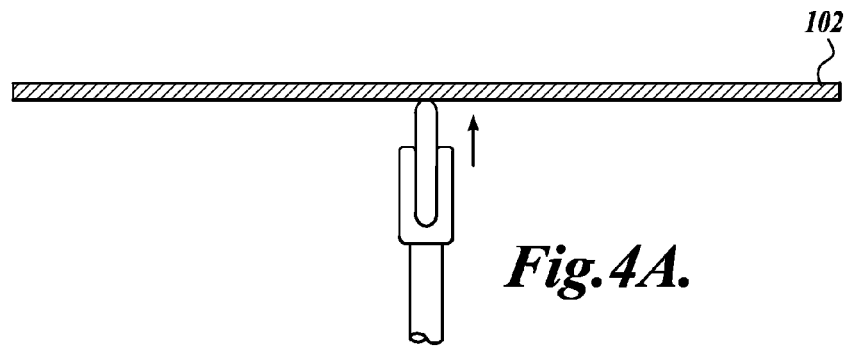
FIGS. 4A-4E illustrate a representative process flow for forming the standing-seam connector illustrated in a FIG. 3 using spin-forming.
Figure 4B:
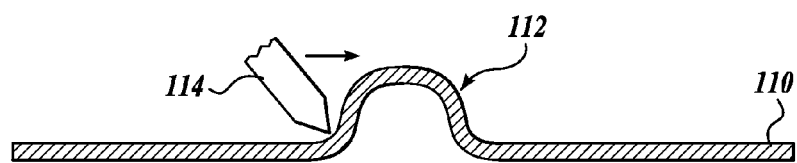
Figure 4C:
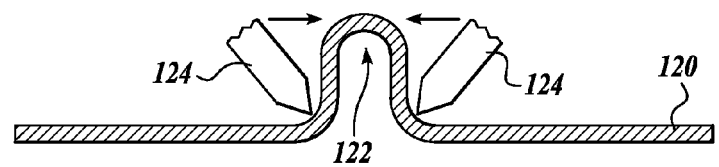
Figure 4D:
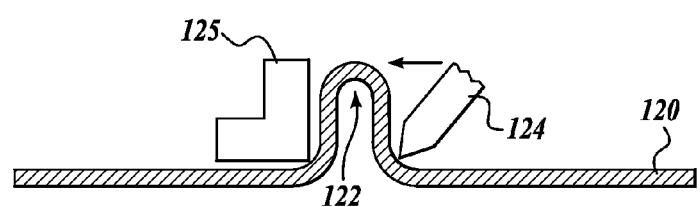

In certain embodiments, the standing seam 66 of the standing-seam connector 60 is formed using spin-forming techniques, as illustrated in FIGS. 4A-4E. Referring now to FIG. 4A, a cylindrical band 102 (i.e., similar to band 10 in FIG. 1) is securely mounted on a spin-forming apparatus (not illustrated). A spin-forming tool 104, such as that illustrated in FIG. 2D, is used to apply pressure from the interior (i.e., radially inward) surface of the band 102 so as to deform the band 102 in a radially outward direction (i.e., away from an outer surface) as the band 10 is spinning at a rapid rate. Referring to FIG. 4B, the band 110 includes a deformed/expanded section 112 resulting from the application of the tool 104 in FIG. 4A. The deformed section 112 is then compressed in the longitudinal direction using a tool 114 applied to the exterior surface of the deformed band 110, as the band continues to spin at high speed. The tool 114 can be applied to one side or both sides of the deformed section 112 to produce the standing seam 136. Alternatively, as illustrated in FIG. 4C, two tools 124 can be used to provide pressure on both sides of the deformed section 122 to produce the standing seam 136 as the band 120 is spinning. As yet another alternative to FIGS. 4B and 4C, as illustrated in FIG. 4D, a backing die 125 can be used as a surface or abutment on/against which to pinch the deformed section using a tool 124.

Figure 4E:
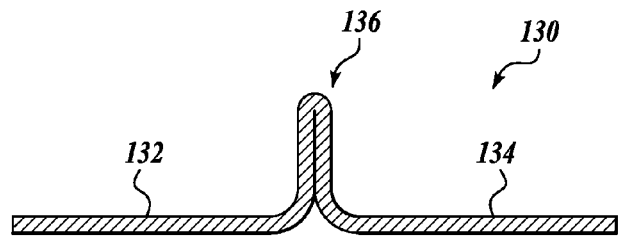

As illustrated in FIG. 4E, regardless of the route (whether via FIG. 4B, 4C, or 4D) a standing-seam connector 130 is produced having a first longitudinal portion 132, a second longitudinal portion 134, and a standing seam 136 extending radially outward from the outward surface of the band.

The connectors provided herein are generally formed in a cylinder (i.e., a cylindrical radial cross-section), but techniques known to those of skill in the art can be used to deform the formed cylindrical connectors into ovals, squares, or rectangles.

Figure 5A:
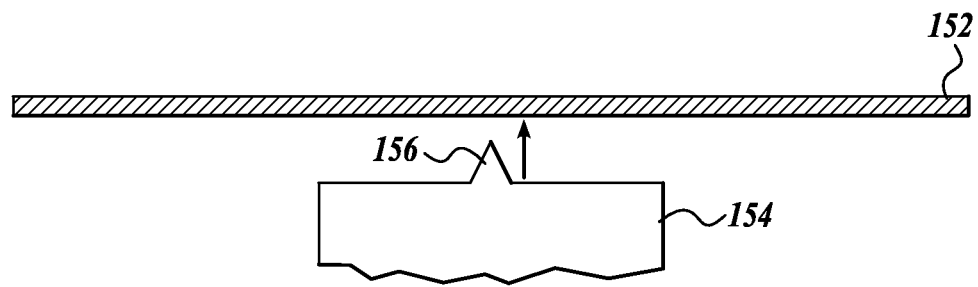
FIGS. 5A-5C illustrate a representative process flow for forming the flanged connector illustrated in a FIG. 3 using an expander to form a V-groove (or other similarly shaped) deformed section.
Figure 5B:
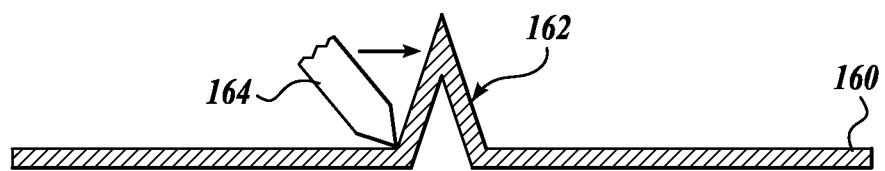
Figure 5C:
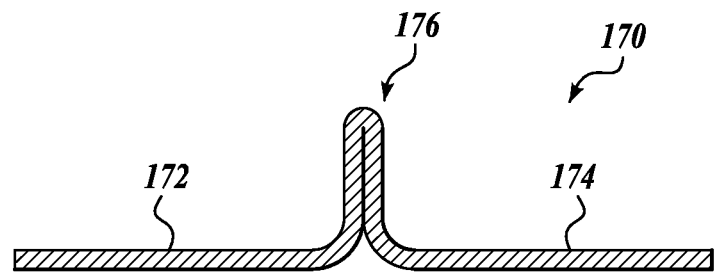

Expansion of a cylinder 152 using an expander can be used as an alternative to the spin-forming method illustrated in FIGS. 4A-4D, to produce a standing-seam connector. Referring to FIGS. 5A-5C, a band 152 is manipulated by an expander mechanism 154 having an outwardly extending protrusion 156 of a shape configured to produce an appropriate deformed section 162 for forming a standing seam 176 for a standing-seam connector 170. As illustrated in FIG. 5A, the protrusion 156 is urged into engagement against the inside surface of the band to create a deformed/expanded section 162 illustrated in FIG. 5B. Referring to FIG. 5B, a tool 164 is used to close the deformed section 162 into a standing seam 176. The standing seam 176 is a doubled-over layer of the band 152.

As discussed above with regard to FIGS. 4B and 4C, one or two tools 164 can be used to close the deformed section 162 into the standing seam 176. Referring to FIG. 5C, the formed product is a standing-seam connector 170 having a first longitudinal portion 172, a second longitudinal portion 174, and a standing seam 176 intermediate. One benefit of using an expander mechanism, such as mechanism 154, is the connector 170 can be constructed of relatively thick material, for example, up to 6-gauge steel.

Figure 7:
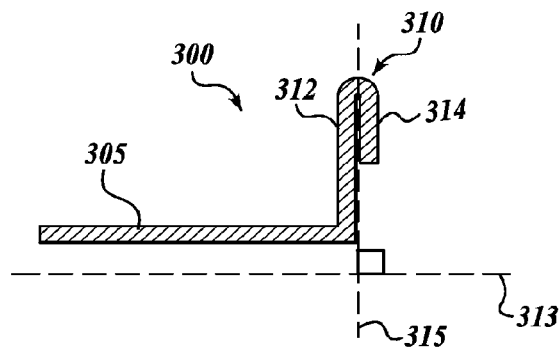
FIG. 7 is a cross sectional view of a flanged connector in accordance with the embodiments provided herein.

Flanged connectors are also provided herein. The flanged connectors can have a cross sectional shape as illustrated in FIG. 7. Many other cross-sectional shapes can be produced using the techniques disclosed. Some of these optional shapes are disclosed in U.S. patent application Ser. No. 11/952,907, published as U.S. Publication No. 2008/0134745 and WO 2008/073837, the disclosures of which are incorporated herein by reference in its entirety.

Referring to FIG. 7, the flanged connector 300 has a longitudinal portion 305 and a flange portion 310, comprising a flange face 312 and a return 314, extending radially outward from the cylindrical longitudinal portion 305. The flanged connector 300 can be fitted into a length of ducting, or formed directly on ducting. The flange face 312 extends up to 2.5 inches radially outward from the longitudinal portion 305, in this and other flanged connector embodiments described herein.

One aspect of the flanged connectors provided herein is the direction that the return 314 folds in relation to the flange face 312. The return 314 folds "outward", such that the return 314 extends beyond the flange face 312 in the longitudinal direction. In certain embodiments, the outward folding of the return 314 results from the method of manufacturing the flanged connector 300. For example, when using spin forming and/or expanding, as disclosed herein, the resulting flanged connector 300 has an outward return 314. The flange face 312 is on a lateral radial plane 315 normal to a longitudinal axis 313 of the longitudinal portion 305.

The flanged connector 300 provided herein can be made using spin-forming, roll forming, expanding, and the like.

Referring to FIGS. 8A-8D, a representative method for forming a flanged connector 380 is provided. Spin-forming is used to work a band 320 using a tool 322 in a similar fashion as described above with reference to FIGS. 4A-4D. The primary difference between FIGS. 4A-4D and the method illustrated in FIGS. 8A-8D is the deformed section 332 in FIGS. 8A-8D is formed at the end of the band 320, while the deformed section 112 of FIGS. 4A-4D is formed near the middle of the band 110.

Figure 8A:
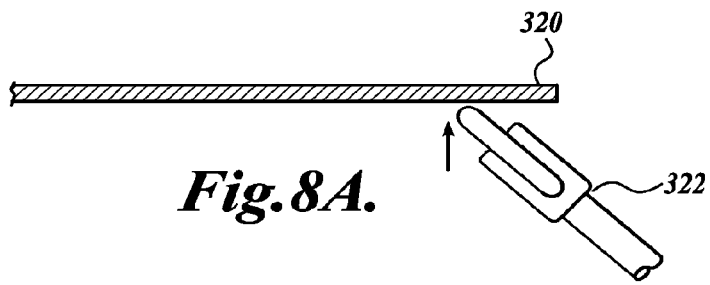
FIGS. 8A-8D illustrate representative process steps for forming the flanged connector illustrated in FIG. 7 using spin-forming.
Figure 8B:
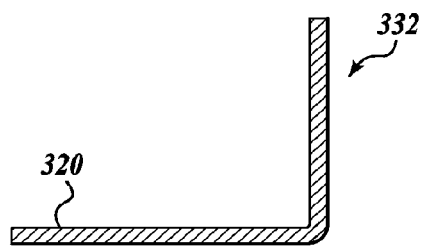

Referring to FIG. 8B, a flange face section 332 is formed using the tool 322 as the band is being spun at high speed. As illustrated, the flange face section 332 extends transversely from the band 320. A backing die or other expedient, not shown, can be used against which the flange face section can be formed.

Figure 8C:
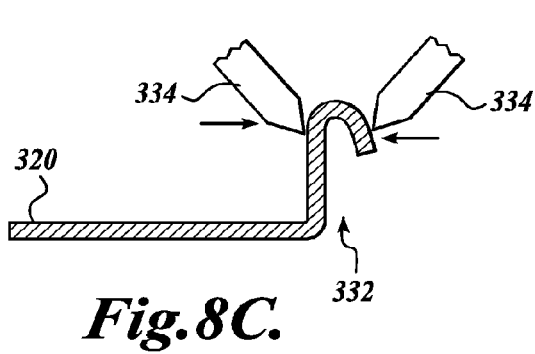
Figure 8D:
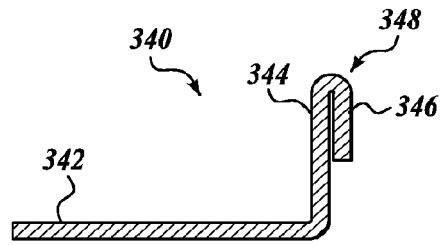

Referring to FIG. 8C, the deformed flange section 332 is further formed as the partially formed band 320 is spinning, using tools 334 to create a return and press the return against the flange face section 332 to form the flanged connector 340 illustrated in FIG. 8D having a longitudinal portion 342, and a standing flange 348 having a transverse flange face 344 and a return 346 overlapping a portion of the flange face. It is to be understood that the return could optionally overlap the entire flange face In one embodiment, the longitudinal portion 342 is a sleeve sized and configured to slidably engage within a length of HVAC ducting. In another embodiment, the longitudinal portion 342 is a length of spiral ducting (i.e., the flange 346 is formed directly on a length of spiral ducting).

Figure 9A:
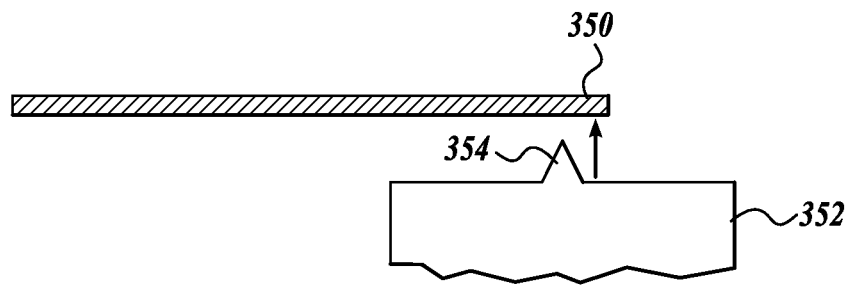
FIGS. 9A-9C illustrate a representative process flow for forming the flanged connector illustrated in a FIG. 7 using an expander to form a V-groove (or similar shaped) deformed section.
Figure 9B:
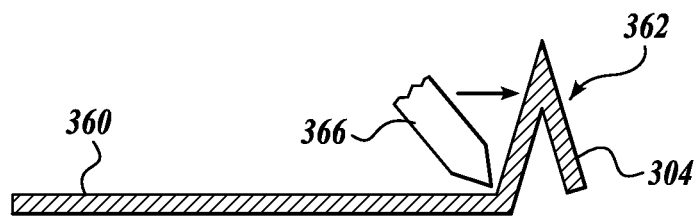
Figure 9C:
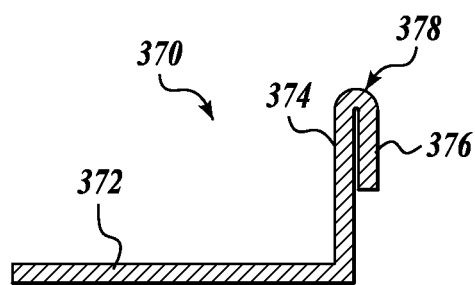

Referring to FIGS. 9A-9C, expansion techniques are used to form a flanged connector 378, such as illustrated in FIG. 7. Similar to FIGS. 5A-5C, the process steps illustrated in FIGS. 9A-9C form a flanged connector 378 instead of a standing seam 176 in a standing-seam connector 170, as illustrated in FIGS. 5A-5C. Referring to FIG. 9A, a band 350 is worked or manipulated on its radially inward surface by an expander mechanism 352 having a radial outwardly extending protrusion 354. The illustrated radial protrusion 354 is V-shaped, although it will be appreciated that any shape can be used as long as it forms the desired shape of deformed section 362.

Referring to FIG. 9B, an outwardly extending deformed section 362 is formed by the expander mechanism 352, wherein the deformed section 362 is on the end of the band 360. Still referring to FIG. 9B, a spin-forming tool 366 is used to compress the deformed section 362 so as to form a flanged connector 370. It is to be understood that the deformed section 362 can be closed or compressed using other tools or techniques, such as by using a press. The completed flanged connector 370 comprises a longitudinal portion 372 and a flange portion 378 comprising a flange face 374 and a return 376. Although the return is shown as overlapping a portion of the flange face 374, the return can instead overlap substantially the entire, or the entire flange face.

Figure 9D:
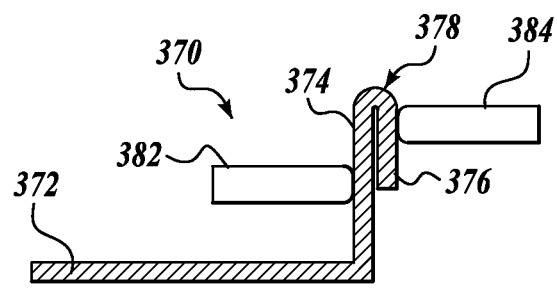
FIGS. 9D and 9E illustrate an optional process flow for forming a hemmed flanged connector from the flanged connector formed in FIG. 5C.
Figure 9E:
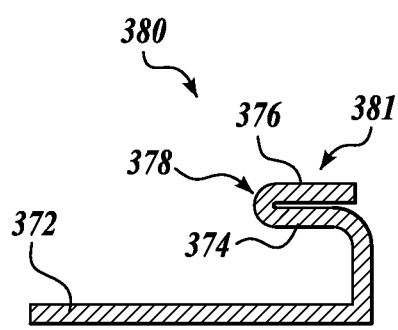

FIGS. 9D and 9E illustrate another process flow for forming a hemmed flanged connector 380 from the flanged connector 370 shown in FIG. 9C. If a hemmed flanged connector 380 is desired, the flanged connector 370 can be further worked from its state in FIG. 9C. In one embodiment, spin forming, and spin-forming tools can be used to bend the flanged connector 370, as illustrated in FIG. 9D. Referring to FIG. 9D, a first tool 382 is positioned at a back surface of the flange face 374 to provide an abutment pivot against which the flange 378 will be bent. A second tool 384 is urged against the return 376 to provide a bending force to form a hemmed flange 381 wherein the return 376 is distal from, and parallel to, the longitudinal portion 372. Referring to FIG. 9E, a completed hemmed flanged connector 380 is illustrated. It is to be understood that in this configuration the height of the flange face extending laterally to the length of the longitudinal portion 372.

While the method illustrated in FIGS. 9D and 9E is described above with reference to spin-forming methods, it will be appreciated that the hemmed flanged connector 380 can also be formed using other techniques known to those of skill in the art, such as with the use of a press.

Figure 10A:
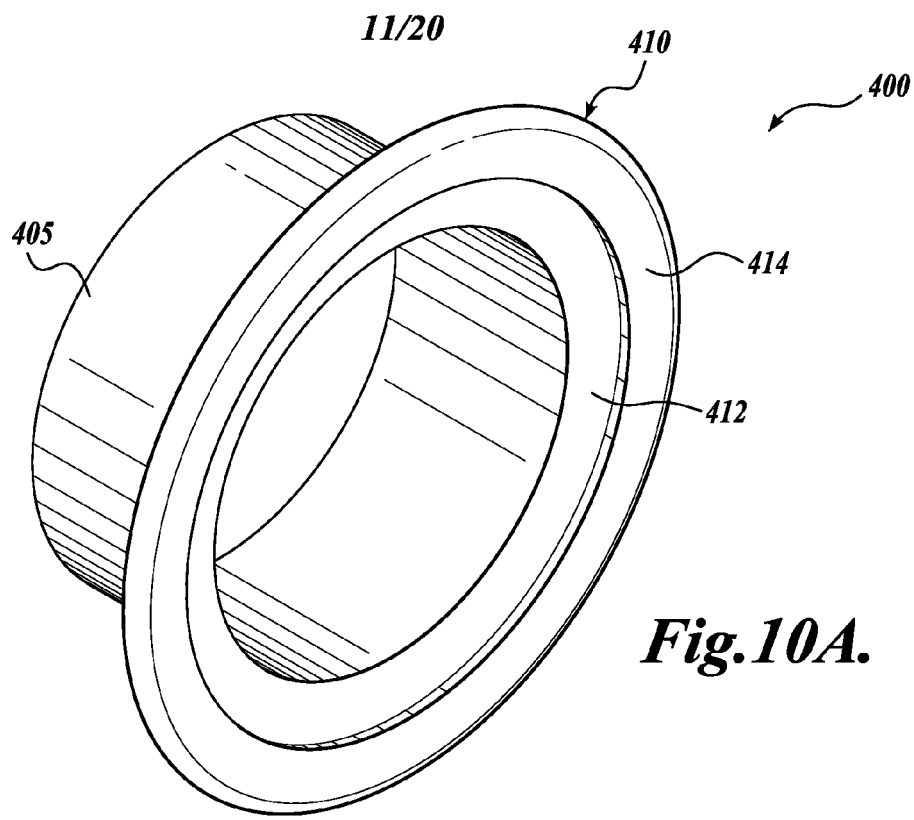
FIGS. 10A and 10B are isometric views of a flanged connector, as illustrated in FIG. 7.
Figure 10B:
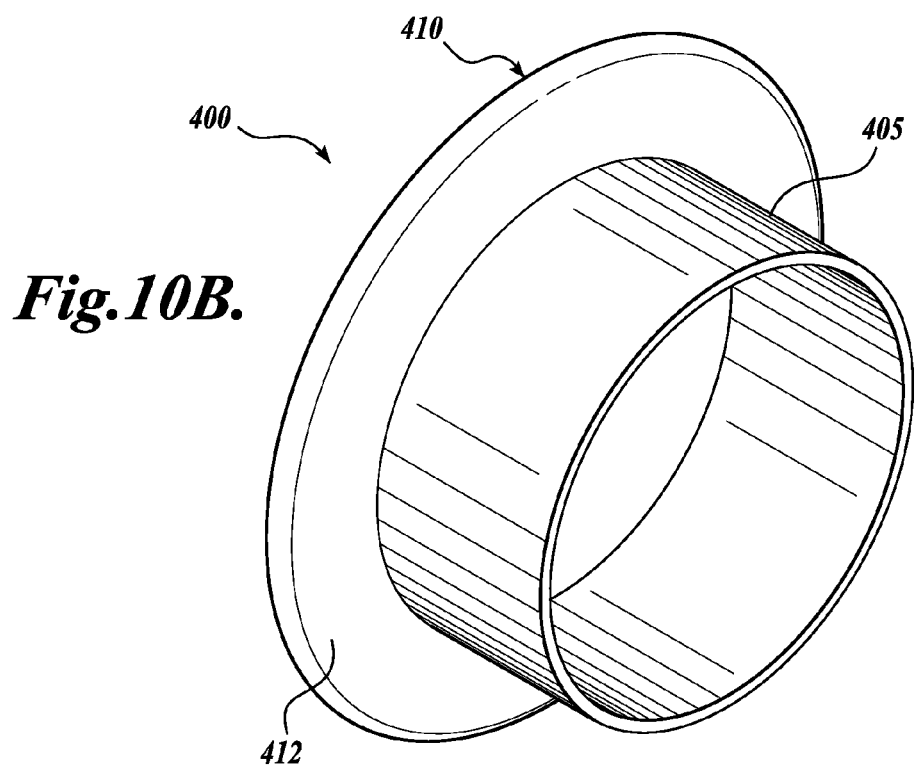

Referring to FIGS. 10A and 10B, isometric views of the flanged connector 300 illustrated in a cross section in FIG. 7 are provided. The depicted flanged connector 400 includes a longitudinal portion 405, for overlapping and attaching to additional lengths of ducting, and a laterally extending flange portion 410 that includes a flange face 412 and a return 414.

Figure 11:
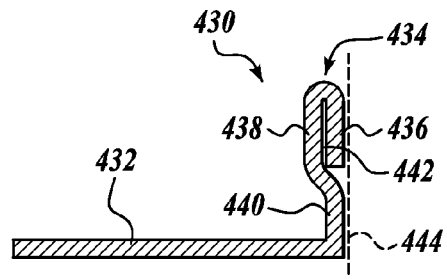
FIG. 11 is a cross sectional view of an offset flanged connector in accordance with the embodiments provided herein.

An offset flanged connector is also provided herein. Referring to FIG. 11, an offset flanged connector 430 is illustrated in cross section. The offset flanged connector 430 includes a longitudinal portion 432 and a laterally extending (annular) flange portion 434 comprising a radially distal flange face section 438 and a return 436. A radially proximal flange face section 440 extends laterally from the longitudinal portion 432. The flange portion 434 is offset longitudinally such that the return 436 and the radially proximal flange face section 440 are substantially co-planar to cooperatively define an offset flange face 444. By providing the offset flange face 444 on the end of the offset flanged connector 430, two offset flanged connectors 430 can be abutted such that their respective offset flange faces 444 will be flush (whereas if two flanged connectors 300, as illustrated in FIG. 7, were to be abutted, only the returns 314 would be flush, in which case a gasket can be used to overlap the flange faces).

Figure 12:
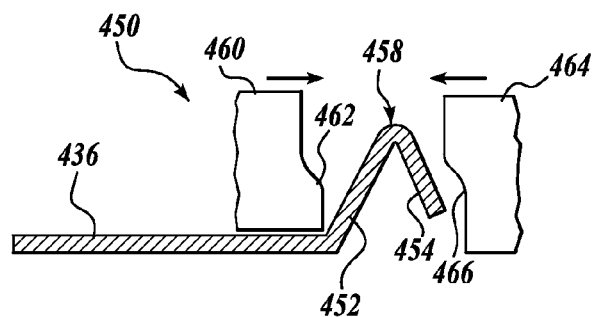
FIG. 12 illustrates a representative method for forming the offset flanged connector illustrated in FIG. 11.

A representative method of forming the offset flanged connector 430 (illustrated in FIG. 11) is provided in FIG. 12. Referring to FIG. 12, a deformed band 450 is created using techniques, such as those used in the methods illustrated in FIGS. 8C and 9B. The band 450 includes a longitudinal portion 456 and a laterally extending deformed section 458 comprising, a flange face 452 and a return 454. The distance between the flange face 452 and the return 454 is closed, and an offset is provided, by compressing (i.e., pinching) the deformed section 458 between two forming tools 460 and 464. The first tool 460 comprises a protrusion 462 upon which the flange face 452 is forced. The second tool 464 comprises a cutout or relief 466 of a shape substantially inverse to that of the protrusion 462, such that when the tools 460 and 464 are compressed, with the deformed section 458 located therebetween, an offset flanged connector 434, having the profile illustrated in FIG. 11, is formed.

Figure 13:
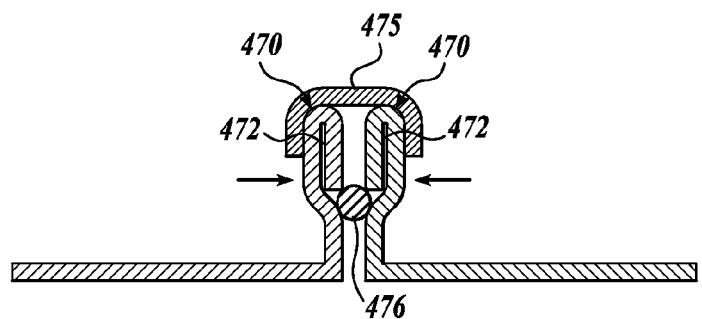
FIG. 13 illustrates the joining two offset flanged connectors (as illustrated in FIG. 11) having a gasket seal intermediate.

Referring to FIG. 13, the formation of a seal between two offset flanged connectors 470 is illustrated. A gasket 476 is provided intermediate the offset flanged connectors 470 such that communication between the interior of the ducting/piping and the pockets 472 within the flanges 470 is not permitted. Such a configuration is desirable for environments where moisture and contaminate control is of utmost concern (e.g., computer chip manufacturing facility HVAC systems). For a seal such as that illustrated in FIG. 13, clamping or other binding or connection methods known to those of skill in the art can be used to secure the flanges 470 and gasket 476 in the desired position. Although the gasket 476 is illustrated is being of nominally round cross-sectional shape, other gasket shapes and configurations can be used. Also, the gasket can be composed of numerous suitable materials. A closure band 475, as are known to those of skill in the art, is illustrated in FIG. 13, and providing the force to form the seal. It will be appreciated that any method for applying pressure to the flanges 470 to form the seal are contemplated.

Figure 14:
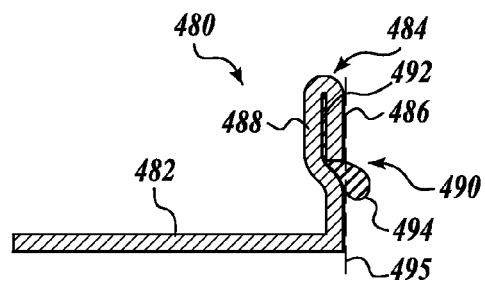
FIG. 14 is a cross sectional view of an offset flanged connector having an embedded gasket therein.

Referring to FIG. 14, an offset flanged connector 480 is illustrated as having an embedded or captured gasket 490. Referring still to FIG. 14, the offset flanged connector 480 comprises a longitudinal portion 482 and a laterally extending flange 484 comprising a flange face section 488 and a return 486. The offset design allows for a gasket 490 to be immobilized within the flange 484. Specifically, the gasket 490 comprises a minor portion 492, embedded within the flange 484, and a major portion 494 disposed adjacent the flange face section 488 and return 486 to project beyond the plane of an offset flange face 495. Such an offset flanged connector 480 is useful to save time and effort when assembling a ducting system, similar to that illustrated in FIG. 13, because positioning of the gasket 490 is provided automatically by the offset flanged connector 480.

The use of an expander mechanism for deforming ducting can also provide a convenient method for joining a length of ducting to a connector, such as the connectors described herein. As illustrated in FIGS. 15A-15E, an expander mechanism 510 having a radially extending protrusion 512 (illustrated as a V-shaped protrusion) is used to lockingly join a length of ducting 508 to a flanged connector 502. It will be appreciated that this embodiment is not limited to joining a length of ducting 508 to a flanged connector 502, nor to the specific hemmed flange 504 illustrated.

Referring to FIG. 15A, the ducting 508 and flanged connector 502 are positioned such that a longitudinal portion 506 of the flanged connector 502 is overlapping longitudinally with the ducting 508. While in the illustrated embodiment the ducting 508 is radially outside the longitudinal portion 506, it will be appreciated that the opposite arrangement is also contemplated.

Referring still to FIG. 15A, the expander mechanism 510 is forced in the radially outward direction into the overlapping area between the ducting 508 and flanged connector 502. As illustrated in FIG. 15B, the result of driving the protrusion 512 into the ducting 508 and longitudinal portion 506 of the flanged connector 502 is the creation of a secure lock joint between the ducting 508 and longitudinal portion 506, the lock joint comprising a first deformed section 516 on the length 508 of ducting and a second deformed section 514 on the longitudinal portion 506 of the flanged connector 502.

The lock joint illustrated in FIG. 15B can be modified to incorporate a gasket 520 between the ducting 508 and the longitudinal portion 506 of the joined pieces (e.g. by placing the gasket 520 between the pieces 508 and 506 prior to forming the lock joint. This results on a secure and sealed joint between the ducting and the flanged connector.

It will be appreciated that the locking method described in FIGS. 15A-15C can also be applied to any two pieces of ducting to be joined together. As illustrated in FIG. 15A, hemmed flange connector is used in the exemplary embodiment; however, as illustrated in FIGS. 15D and 15E, the method described herein is not limited to such a configuration. As illustrated in FIG. 15D, two longitudinal lengths 530 and 532 of ducting are joined together using the method. The lengths 530 and 532 are locked together by deformed sections 534 and 536. Similarly, as illustrated in FIG. 15E, a standing flanged connector 540 is illustrated joined to a length of ducting 546. The flanged connector 540 has a flange 542, similar to flanged connectors described herein (e.g., with reference to FIG. 7). The flange 542 is connected to a longitudinal portion 544, which is then locked to the ducting 546 by deformed sections 548 and 550.

FIG. 15F illustrates yet another embodiment, wherein the ducting 552 is joined to the flanged connector 502 through deformations 558 and 556 resulting from an expanding machine. The deformation 556 on the flanged connector 502 only includes an "upward" deformation, whereas the deformation 558 on the ducting 552 includes both upward and downward sections, to form a complete v-shaped deformation 558. This embodiment saves material by requiring only the upward deformation on the flanged connector 502, yet locking between the flanged connector 502 and the ducting 552 is still completed.

Several different flanges are provided in the various embodiments described herein. For example, FIGS. 15A-15C illustrate a hemmed flange 502 and FIG. 15E illustrates a flange 542 having a radial return. The methods for making flanged connectors described herein can be used to make several alternative flange configurations, as illustrated in FIGS. 24A-24G.

Figure 24A:
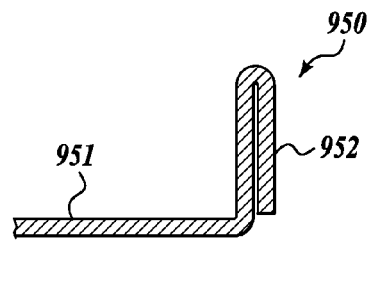
FIGS. 24A-24G illustrate cross-sectional profiles of representative flanges in accordance with the embodiments provided herein.

Referring to FIG. 24A, a flanged connector 950 is provided having a full return 952 (i.e., standing seam) covering the entire flange face. The connector 950 can be formed in a similar manner as described above, for example, with reference to FIGS. 7-9C.

Figure 24B:
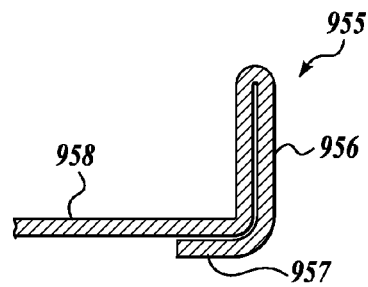

Referring to FIG. 24B, a flanged connector 955 is provided having a return comprising a radial section 956 and a longitudinal section 957 folded within a longitudinal portion 958 of the connector 955. The connector 955 can be formed in a similar manner as described above, for example, with reference to FIGS. 7-9C and 24A with the additional step of working the longitudinal section 957 into longitudinal alignment with the longitudinal portion 958.

Figure 24C:
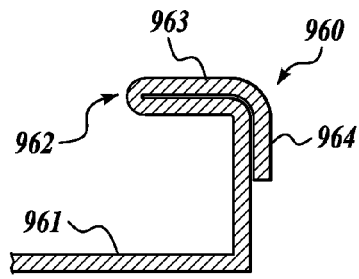

Referring to FIG. 24C, a flanged connector 960 is provided having a hemmed flange 962 having a return comprising a longitudinal section 963 (parallel to a longitudinal portion 961 of the flanged connector 960) and a partial radial section 964. The hemmed flange 962 can be formed, for example, by first forming the flanged connector 950 illustrated in FIG. 24A and then worked with tools (e.g., spin-forming tools) in a manner similar to that illustrated in FIGS. 9D and 9E with the additional step of working the partial radial section 964 into radial alignment.

Figure 24D:
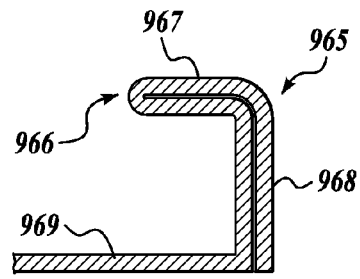

Referring to FIG. 24D, a flanged connector 965 is provided having a hemmed flange 966 having a return comprising a longitudinal section 967 (parallel to a longitudinal portion 969 of the flanged connector 965) and a full radial section 968 stretching radially to the longitudinal portion 969. The connector 965 can be formed, for example, in the same manner as described with reference to FIG. 24C.

Figure 24E:
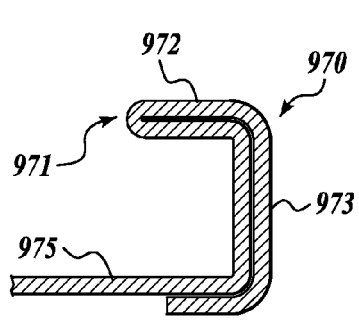

Referring to FIG. 24E, a flanged connector 970 is provided having a hemmed flange 971 having a return comprising an outward longitudinal section 972 (parallel to a longitudinal portion 975 of the flanged connector 970), a radial section 973, and an inward longitudinal section 974 folded within the longitudinal portion 975. The connector 970 can be formed, for example, in the same manner as described with reference to FIGS. 24B and 24C.

Figure 24F:
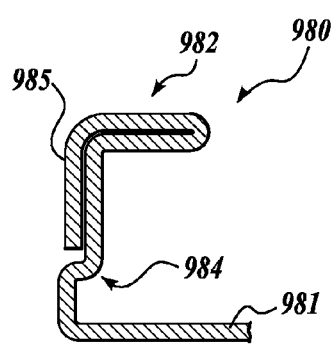

Referring to FIG. 24F, an offset flanged connector 980 is provided having an offset section 984 offsetting a flange portion 982 longitudinally. The return 985 forms the plane of the flange face. The connector 980 can be formed, for example, in the same manner as described with reference to FIGS. 11, 12, and 24C. Two offset flanged connectors 980 can be coupled together to form a seam, such as in FIG. 13.

Figure 24G:
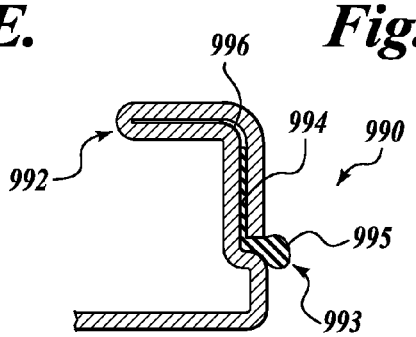

Referring to FIG. 24G, an offset flanged connector 990 is provided, similar to that illustrated in FIG. 24F, although also including a gasket 993 having a minor portion 994, embedded in a cavity 996 of an offset flange 992, and a major portion 995, positioned adjacent the flange face. An embedded gasket 993 provides the benefit of removing the difficulty of positioning a gasket between two flanges during assembly of a seam, as described above with reference to FIG. 14. The connector 990 can be formed, for example, in the same manner as described with reference to FIGS. 11-14 and 24F.

Figure 16:
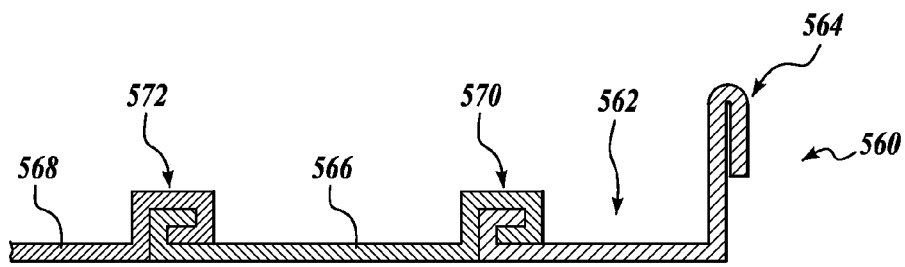
FIG. 16 is a cross sectional view of a representative length of spiral ducting having a flanged connector, as illustrated in FIG. 7, in accordance with the embodiments provided herein.
Figure 17:
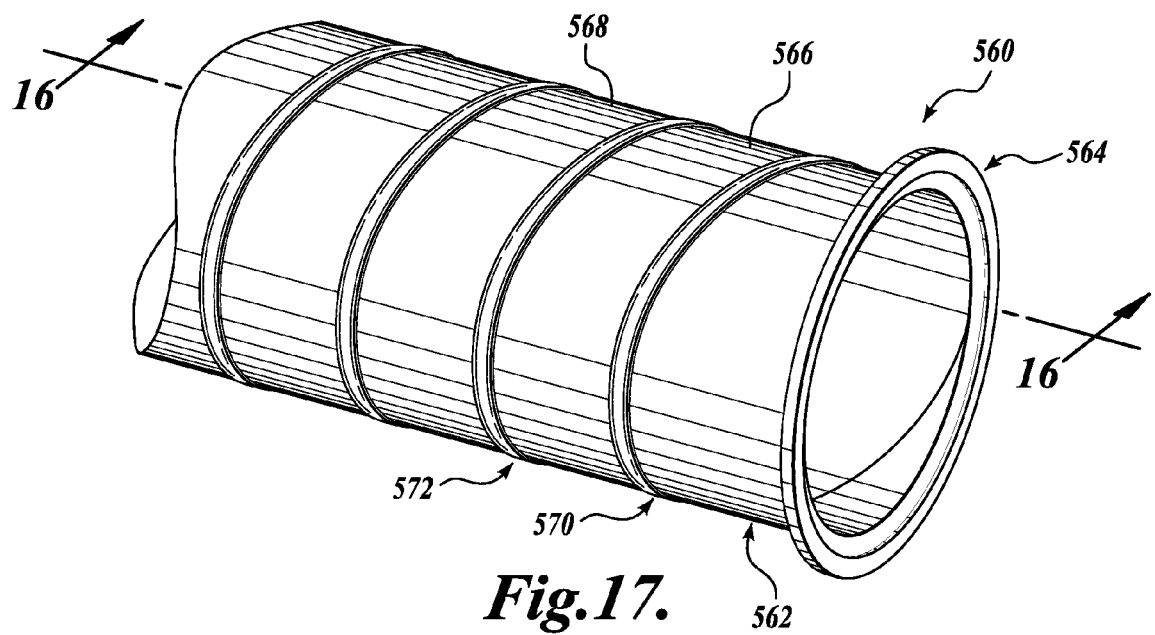
FIG. 17 is an isometric view of a length of spiral ducting having a cross section as illustrated in FIG. 16.

In another aspect, flanged ducting and a method for forming a flange directly on the end of a length of spiral ducting is provided. Referring to FIG. 16, a cross sectional view of a length of spiral ducting is illustrated. The spiral ducting 560 comprises a flange portion 562, having a flanged connector 564, wherein the flange portion 562 is spirally connected to longitudinal portions 566 and 568. Longitudinally, the three portions 562, 566, and 568 are joined together by lock seams 570 and 572. An isometric view of the flanged ducting 560 is illustrated in FIG. 17.

One advantageous aspect of the methods for forming a flanged end on spiral ducting, as provided herein, is that the flange is not indexed directly to the end face of the cut spiral ducting. As illustrated in FIG. 18A, this allows the formation of a flanged connector 610 having a flange face 312 and a return 314 having a "wandering" edge. That is, the length of the return 314 varies through the circumference of the return 314.

Figure 18:
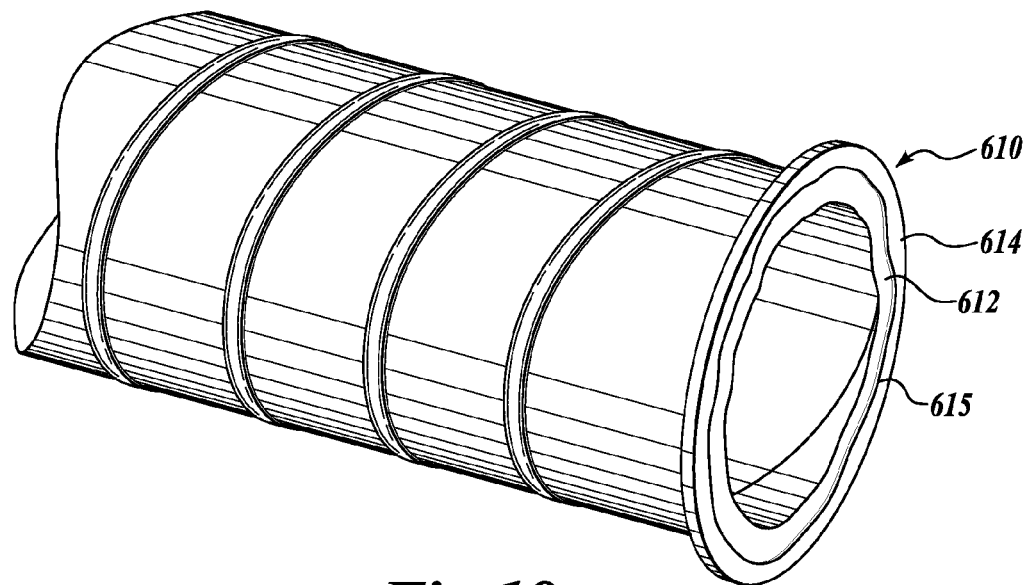
FIG. 18 is an isometric view of a length of spiral ducting having a flange, as illustrated in FIG. 7, wherein the flange return is of non-uniform length.

The "wandering" return 314 illustrated in FIG. 18 may be better understood with reference to FIGS. 19 and 20A-20C, which illustrate an exemplary method for manufacturing the flange 610 illustrated in FIG. 18.

Figure 19:
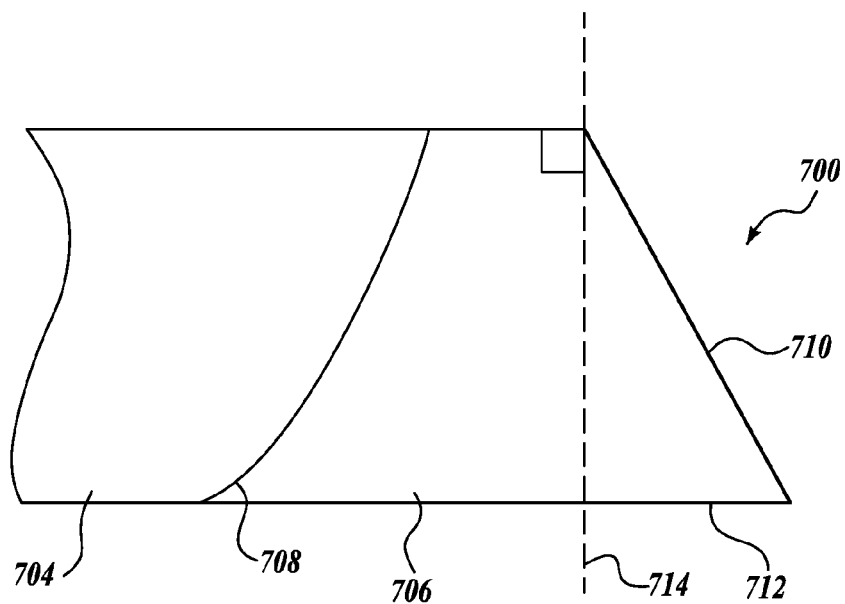
FIG. 19 illustrates an end-piece of spiral ducting cut with an uneven terminal end.

Referring to FIG. 19, a cut end portion of spiral ducting 700 is illustrated. As is known to those of skill in the art, because spiral ducting is formed from rectangular lengths of metal, to produce an end face the ducting must be cut to form an end face normal to the longitudinal direction of the ducting. However, such cuts are often skewed and therefore a typical end face of ducting 700 is illustrated in FIG. 19, wherein the end face 710 is skewed from longitudinal normal 714 so as to produce an overhang 712. The length of ducting 702 includes longitudinal portions 704 and 706 joined by a lock seam 708.

Figure 20A:
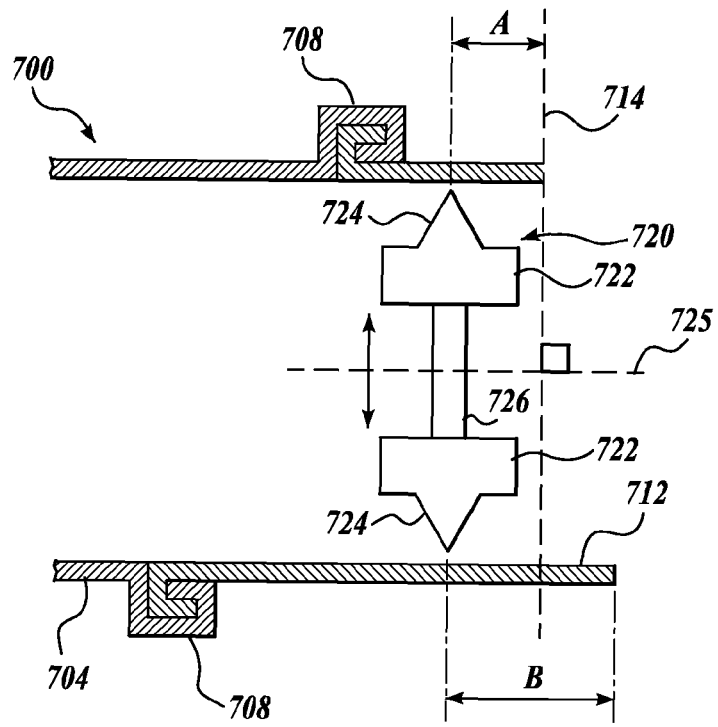
FIGS. 20A, 20B, and 20C illustrate a representative method for forming a flanged connector, shaped similarly to the flanged connector illustrated in FIG. 7, in accordance with the embodiments provided herein on a length of spiral ducting.
Figure 20B:
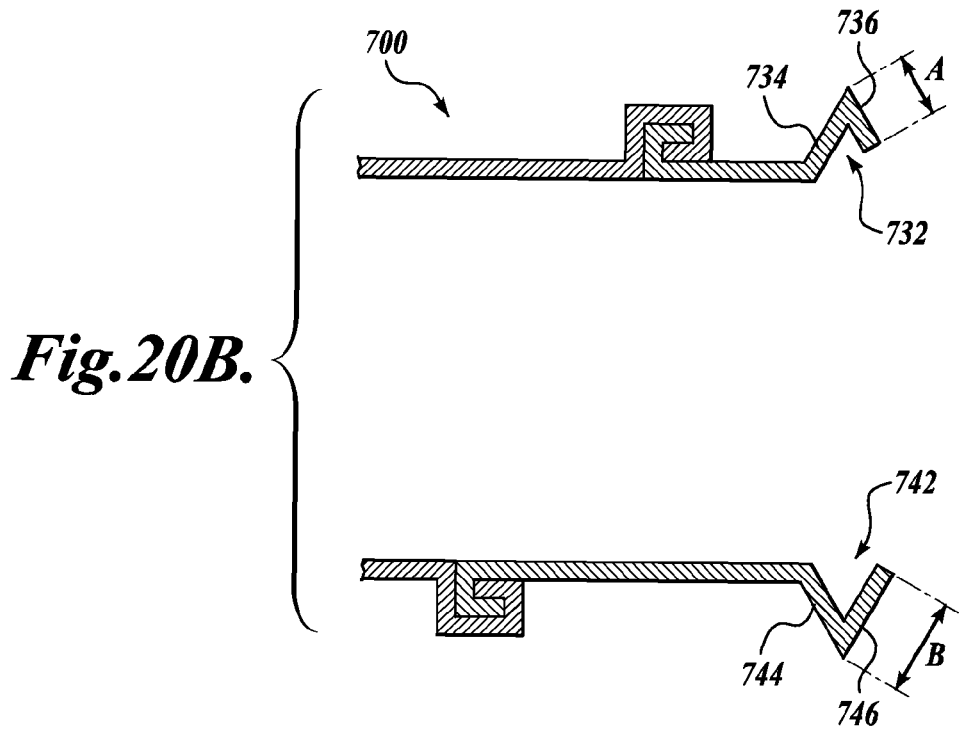

To form a flange directly on the end of the ducting 700, an expander mechanism 720 is used, as is diagrammatically illustrated in FIG. 20A. The expander mechanism 720 includes a plurality of expansion segments 722, each having a radially outwardly extending protrusion 724 of the desired shape. An expansion means 726 (e.g. a pneumatic press) pushes the expansion segments 722 uniformly radially outwardly towards the interior surface of the spiral ducting 700 to push outwardly and shape the ducting 700. The expander mechanism 720 is arranged in relation to the ducting 700 according to a longitudinal axis 725, which is lateral (normal) to the longitudinal normal 714. As illustrated in FIG. 20B, a first deformed section 732 comprising a flange face 734 and a return 736 is formed, as is a second deformed section 742 having a flange face 744 and a return 746. As illustrated in FIG. 20B, the distance A on the first deformed section 732 is smaller than the distance B at the diametrically opposite second deformed section 742, a direct result of the overhang 712 illustrated in FIGS. 19 and 20A.

Figure 20C:
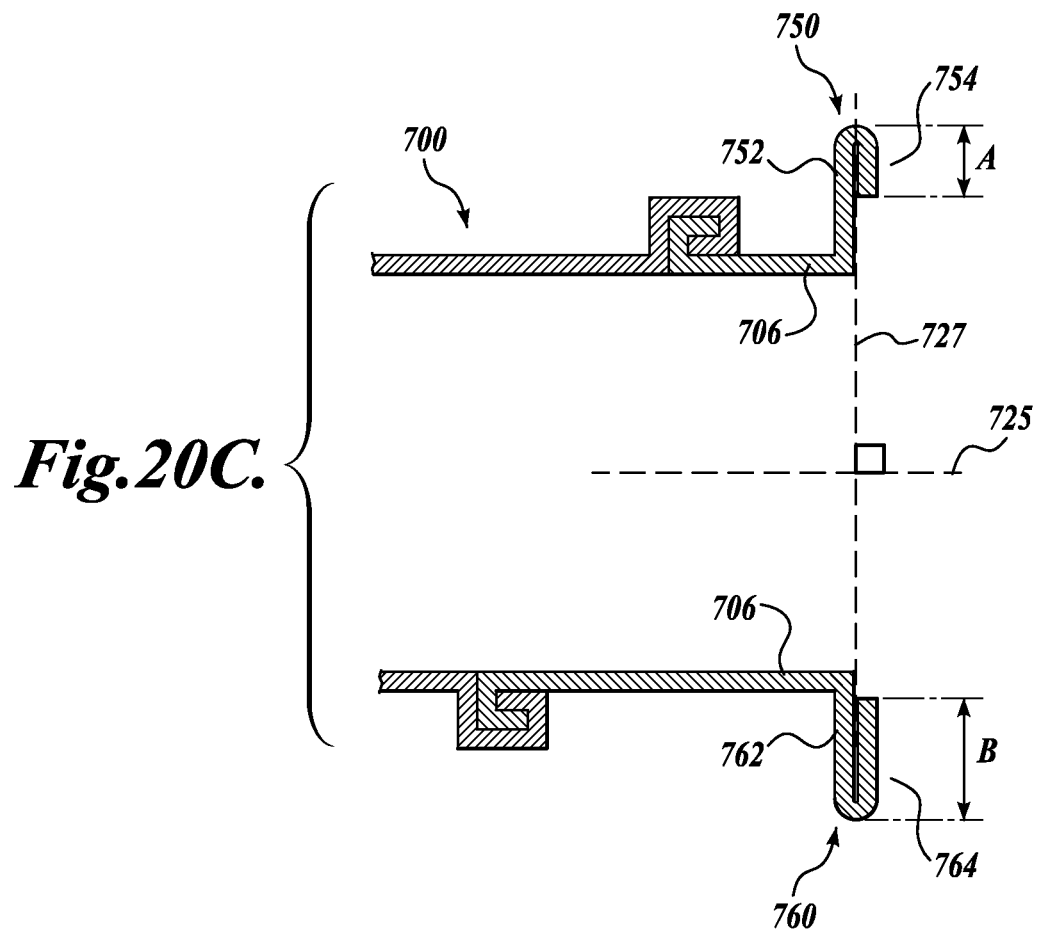

The deformed spiral ducting 700 illustrated in FIG. 20B can then be further worked (e.g., spin formed, pressed, rolled) to form a flanged connector, as described herein. Particularly, with reference to FIG. 20C, a first flanged connector section 750 comprises a flange face 752 and a return 754 having a length A. A second opposite flanged connector section 760 comprises a flange face 762 and a return 764 having a length B. It will be appreciated that the cross sectional illustrations of FIGS. 20A-20C provide the appearance of two separate pieces of the spiral ducting 700, but the pieces (e.g., flanges 750 and 760) are joined together continuously. The flange faces 752, 762 are on a lateral radial plane 727 normal to the longitudinal axis 725 of the ducting 700. It is to be understood that the flanged connector section 750 can be of various configurations, including those described therein for the various configurations of the stand seam connectors.

Figure 21:
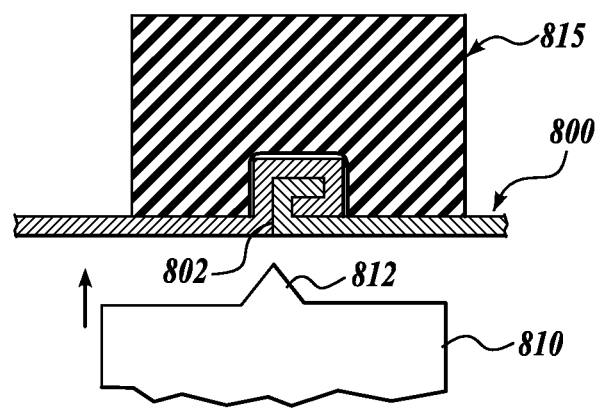
FIG. 21 illustrates a representative method for forming a V-groove using an expander and a rubber backing.

One potential difficulty when performing the method illustrated in FIGS. 20A-20C is the use of an expander 810 on spiral ducting 800. Particularly, referring to FIG. 21, the spiral ducting 800 has a lock seam 802 that may tend to unravel or be warped (e.g. to sit normal to the longitudinal length of ducting) so as to compromise the integrity of the ducting. This can be the result of the action of the protrusion 812 on the lock seam 802. To alleviate this potential for deformation of the lock seam 802, a backing 815 can optionally be used in certain embodiments to counteract the radially outward pressure applied to the lock seam 802 by the protrusion 812. Particularly useful is a deformable or elastic material, such as rubber or synthetic rubber, which will conformally mate with the surface of the lock seam 802 and apply the necessary pressure to keep the lock seam 802 in its original state while the protrusion 812 is pressed into the lock seam 802. In another embodiment, a hydroforming process, as is known to those of skill in the art, can be used to immobilize the lock seam 802 during expanding.

Figure 22A:
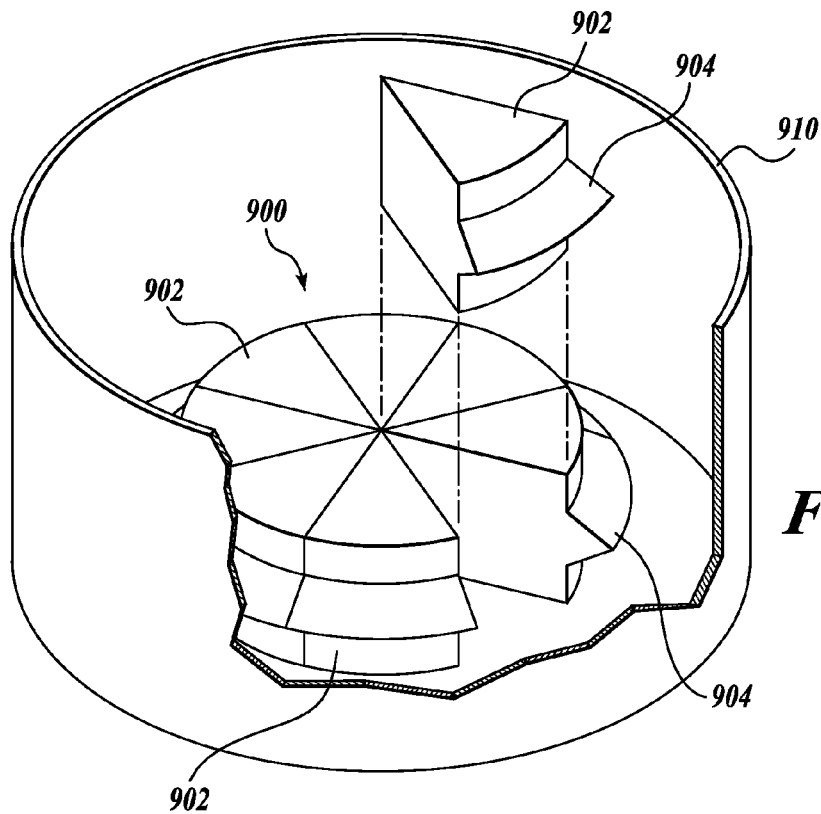
FIGS. 22A and 22B illustrate the use of an expander to form a V-groove in a duct or pipe in accordance with the embodiments provided herein.
Figure 22B:
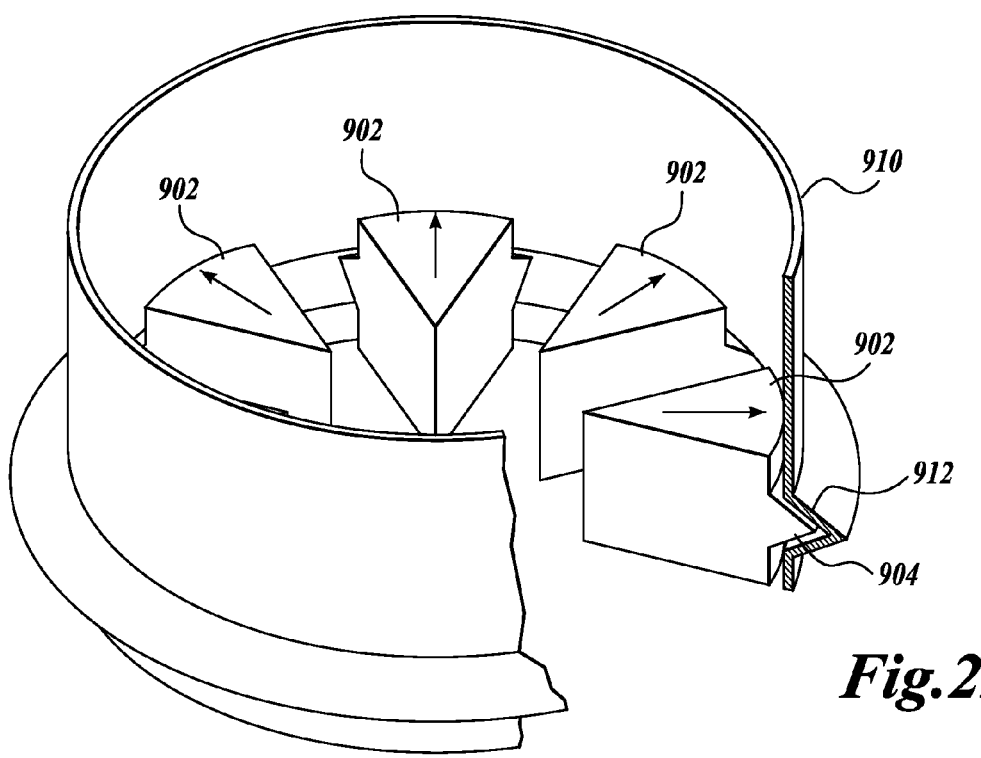

Several of the embodiments described herein utilize an expander mechanism as a tool for performing one or more steps in a method for forming a flange or standing seam connector. While expander machines are known in the prior art, the following description provides one exemplary particular type of expander machine useful in performing the embodiments disclosed herein. With reference to FIG. 22A, an expander 900 comprises a plurality of expander segments 902, each having a radially outwardly extending protrusion 904 projecting from its exterior surface. The protrusion 904 faces a portion of ducting 910 coaxially aligned with the expander 900. Referring to FIG. 22B, the expander 900 operates by radially forcing the pieces 902 outward to press against the inside surface of the ducting 910. The ducting 910 is deformed by the protrusions 904 to form a circumferential deformed section 912, which can then be used to create a flange or seam as disclosed further herein (e.g. by spin forming, pressing, etc.). While the exemplary embodiments disclosed herein typically describe the protrusion 904 of the expander segment 902 as being wedge shaped or triangular in cross section, it will be appreciated that any shape useful for providing the desired deformed section 912 in the ducting 910 is contemplated, such as semi-oval, semi-circular, semi-elliptical, etc.

Figure 23A:
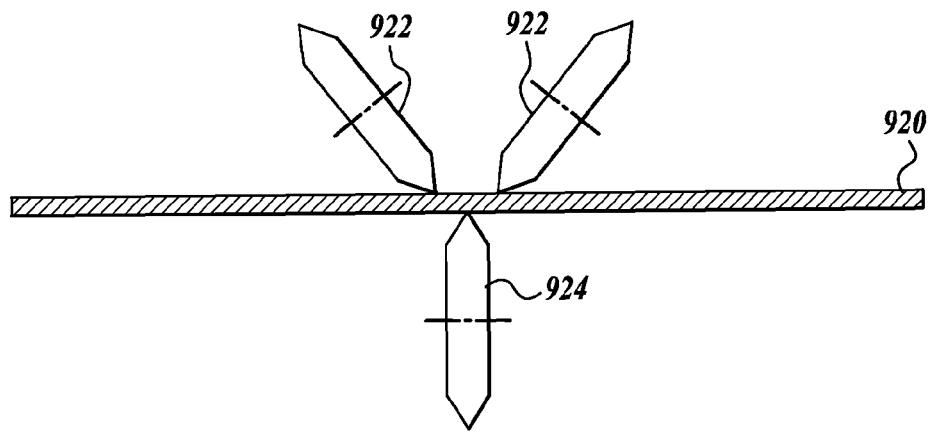
FIGS. 23A-23C illustrate a representative process flow for forming a standing-seam connector using roll forming, in accordance with the embodiments provided herein.
Figure 23B:
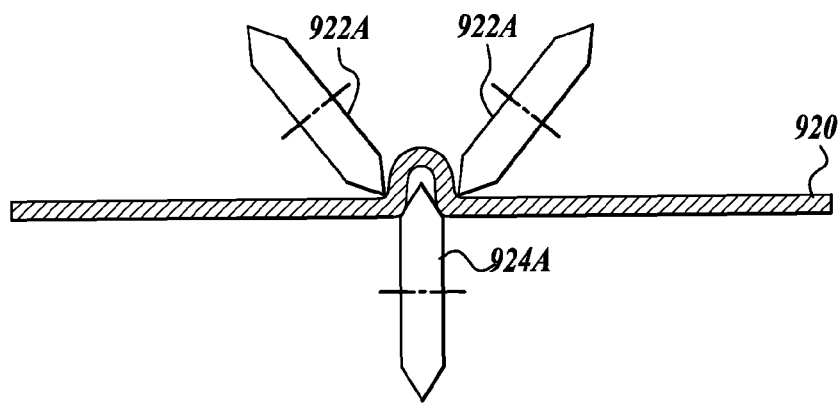
Figure 23C:
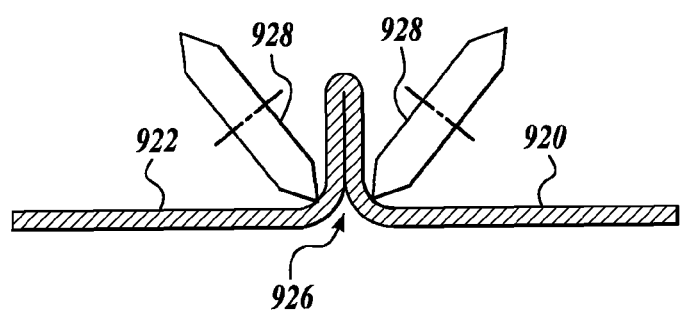

The technique of roll forming is also useful in certain embodiments disclosed herein. For example, roll forming can be used to make the standing-seam connector illustrated in FIG. 3, as illustrated in FIGS. 23A-23C. Referring to FIG. 23A, a flat metal sheet 920 is urged (normal to the plane of the figure) past roll-forming tools 922 and 924. As illustrated in FIG. 23B, the first roller tool 924A applies pressure from the underside of the sheet 920 so as to form a deformed section, which is then compressed laterally by second roller tools 922A. A series of such roller tools can be used to sequentially from the deformed section. Finally, as illustrated in FIG. 23C, roller tools 928 can be used to provide lateral pressure on the exterior or the deformed section until the standing seam 926 is formed. It is to be understood that roller tools of other configurations can be used in place of tools 922, 924, and 928 illustrated. Also, such roller tools can be used to produce a standing seam connector as well as ring flange connector with or without a return.

While illustrative embodiments have been illustrated and described, it will be appreciated that various changes can be made therein without departing from the spirit and scope of the invention.

The embodiments of the invention in which an exclusive property of privilege is claimed are defined as follows:

1. A method for forming a standing seam connector from a cylindrical metal band having a radially outward surface and a radially inward surface, the method comprising:

deforming substantially the entire circumference cylindrical metal band using pressure applied from a tool pressing against the interior surface of the band at a location intermediate a first longitudinal portion and a second longitudinal portion of the band, to provide a deformed section of the band extending radially outwardly from the outer surface of the band, wherein the tool used to deform the band is an expander mechanism comprising a plurality of expander wedges centered on an expander axis and extending substantially around the entire circumference of the cylindrical metal band, each expander wedge having a radially outwardly extending protrusion on a distal edge surface of the expander wedge, said distal edge surface of the expander wedge extending longitudinally along the length of the cylindrical band, said protrusion extending a distance along an intermediate portion of the distal edge surface of each expander wedge, wherein the distal edge surface of the expander wedge extends longitudinally in opposite directions from the protrusion to the longitudinal ends of the expander wedge to provide support for adjacent sections of the cylindrical metal band, wherein the expander mechanism is configured to apply a concentrated radially outward pressure on the band with the radial protrusions, whereby the radially outwardly extending protrusions of the expander wedges expanding the metal band to form the deformed section in the metal band, whereby the deformed portion of the metal band is doubled over on itself and protruding radially outwardly of the band, said deformed section dividing the band into first and second longitudinal sleeve portions extending in opposite directions from said doubled over deformed section, said first and second longitudinal sleeve portions being of substantially the same outer diameter corresponding to the nominal outer diameter of said cylindrical metal band prior to the deforming of the metal band by the tool; and compressing the radially outwardly deformed doubled-over section in the longitudinal direction to be in face-to-face relationship to form a transverse, annular, standing seam intermediate the first and second longitudinal portions and extending radially outward of the outward surface of the band.

2. The method of claim 1, wherein the radially outward deformed section is compressed in the longitudinal direction by spin forming.

3. The method of claim 1, wherein the band has a thickness, and wherein the standing seam has a thickness that is twice the thickness of the band.

4. The method of claim 1, wherein the first longitudinal portion and the second longitudinal portion of the band are about the same longitudinal length.

5. The method of claim 1, wherein the first longitudinal portion is a first sleeve portion and the second longitudinal portion is a second sleeve portion, and wherein the first and second sleeve portions are sized and configured to slidably engage HVAC ducting.

\* \* \* \* \*